US 8,284,204 B2

(12) United States Patent
Kalaiah et al.

(10) Patent No.: US 8,284,204 B2
(45) Date of Patent: Oct. 9, 2012

(54) APPARATUS, METHOD AND A COMPUTER PROGRAM PRODUCT FOR PROVIDING A UNIFIED GRAPHICS PIPELINE FOR STEREOSCOPIC RENDERING

(75) Inventors: Aravind Kalaiah, Sunnyvale, CA (US); Tolga Capin, Irving, TX (US)

(73) Assignee: Nokia Corporation, Espoo (FI)

( * ) Notice: Subject to any disclaimer, the term of this patent is extended or adjusted under 35 U.S.C. 154(b) by 811 days.

(21) Appl. No.: 11/428,159

(22) Filed: Jun. 30, 2006

(65) Prior Publication Data
US 2008/0007559 A1    Jan. 10, 2008

(51) Int. Cl.
*G06F 15/00*    (2006.01)

(52) U.S. Cl. ........ 345/501; 345/419; 345/421; 345/422; 345/424; 345/427

(58) Field of Classification Search .................. 345/418, 345/419, 421, 422, 427, 501; 717/109, 108, 717/113, 116
See application file for complete search history.

(56) References Cited

U.S. PATENT DOCUMENTS

| | | | | |
|---|---|---|---|---|
| 5,982,375 A * | 11/1999 | Nelson et al. | .................. | 345/419 |
| 6,097,394 A * | 8/2000 | Levoy et al. | .................. | 345/419 |
| 6,295,041 B1 * | 9/2001 | Leung et al. | ................... | 345/89 |
| 6,429,867 B1 * | 8/2002 | Deering | ........................ | 345/423 |
| 6,496,183 B1 | 12/2002 | Bar-Nahukm | | |
| 6,567,095 B2 * | 5/2003 | Wood | ............................ | 345/587 |
| 6,650,323 B2 * | 11/2003 | Naegle et al. | ................. | 345/419 |
| 6,693,639 B2 * | 2/2004 | Duluk et al. | .................. | 345/506 |
| 6,731,289 B1 * | 5/2004 | Peercy et al. | ................. | 345/503 |
| 6,738,069 B2 * | 5/2004 | Doyle | ........................... | 345/556 |
| 7,129,941 B2 * | 10/2006 | Deering et al. | .............. | 345/422 |
| 7,145,577 B2 * | 12/2006 | Hunter | .......................... | 345/613 |
| 7,180,554 B2 * | 2/2007 | Divelbiss et al. | ............. | 348/742 |
| 7,385,608 B1 * | 6/2008 | Baldwin | ........................ | 345/506 |
| 2002/0015007 A1 * | 2/2002 | Perlin et al. | ....................... | 345/6 |
| 2002/0130886 A1 * | 9/2002 | Baldwin | ........................ | 345/611 |

(Continued)

FOREIGN PATENT DOCUMENTS

WO    WO 03/039698 A1    5/2003

OTHER PUBLICATIONS

Samanta et al.; Parallel Rendering with K-Way Replication, Princeton Universit, 2001, pp. 75-84.*
Hasselgren et al., "An Efficient Multi-View Rasterization Architecture," *Rendering Techniques 2006*, Proceedings of Eurographics Symposium on Rendering, Jun. 26-28, 2006, pp. 61-73.

(Continued)

*Primary Examiner* — Said Broome
*Assistant Examiner* — Abderrahim Merouan
(74) *Attorney, Agent, or Firm* — Alston & Bird LLP

(57) ABSTRACT

A device for rendering to multiple viewpoints of a stereoscopic display is provided. The device includes vertex shaders which receive vertices corresponding to primitives and process viewpoint dependent information. The device also includes a primitive replication unit which replicates primitives according to a number of viewpoints supported by the stereoscopic display. The primitive replication unit adds unique view tags to each of the primitives which identify the viewpoint that the respective primitive is destined for. Each replicated primitive is processed by a rasterizer and converted into pixels. The rasterizer adds a view tag to the rasterized pixels so that the pixels identify a respective primitive and identify a respective pixel buffer that the pixel is destined for. The pixels can then be processed by a pixel processing unit and written to a pixel buffer corresponding to a respective viewpoint. The pixels are subsequently output to the stereoscopic display.

23 Claims, 16 Drawing Sheets

U.S. PATENT DOCUMENTS

| | | | |
|---|---|---|---|
| 2002/0163482 A1* | 11/2002 | Sullivan | 345/6 |
| 2003/0020709 A1* | 1/2003 | Naegle et al. | 345/419 |
| 2003/0122851 A1* | 7/2003 | Doyle | 345/620 |
| 2003/0164823 A1* | 9/2003 | Baldwin et al. | 345/419 |
| 2003/0164840 A1* | 9/2003 | O'Driscoll | 345/611 |
| 2004/0008203 A1* | 1/2004 | Rodrigues et al. | 345/535 |
| 2004/0012600 A1* | 1/2004 | Deering et al. | 345/506 |
| 2004/0130552 A1* | 7/2004 | Duluk et al. | 345/506 |
| 2004/0160450 A1* | 8/2004 | Doyle | 345/552 |
| 2004/0179262 A1 | 9/2004 | Harman et al. | |
| 2004/0217967 A1* | 11/2004 | Doyle et al. | 345/572 |
| 2005/0117019 A1* | 6/2005 | Lamboray et al. | 348/159 |
| 2005/0151730 A1 | 7/2005 | Lobregt | |
| 2006/0028400 A1* | 2/2006 | Lapstun et al. | 345/8 |
| 2006/0028479 A1* | 2/2006 | Chun et al. | 345/531 |

OTHER PUBLICATIONS

Halle, M., "*Autostereoscopic displays and computer graphics*," May 1997 Computer Graphics, ACM SIGGRAPH, 31(2), pp. 58-62.

Jones et al., "*Controlling Perceived Depth in Stereoscopic Images*," Stereoscopic Displays and Virtual Reality Systems VIII, Proceedings of SPIE vol. 4297 (2001), pp. 42-53.

Halle, M., "*Multiple Viewpoint Rendering*," Brigham and Women's Hospital, ACM 1998, pp. 1-12.

Kalaiah, A., "*Unified Pipeline for Multiple Viewpoint Rendering*," Eurographics 2006/E. Groller and L. Szirmay-Kalos (guest editors), vol. 25 (2006), No. 3, pp. 1-9.

Segal et al., "*The OpenGL Graphics System: A Specification*," Version 2.0, Oct. 22, 2004, 382 pages.

\* cited by examiner

APPARATUS, METHOD AND A COMPUTER PROGRAM PRODUCT FOR PROVIDING A UNIFIED GRAPHICS PIPELINE FOR STEREOSCOPIC RENDERING

FIELD OF THE INVENTION

Embodiments of the present invention relate generally to autostereoscopic display technology and, more particularly, relate to a method, device and computer program product for processing three-dimensional content to facilitate display of the three-dimensional content on autostereoscopic displays.

BACKGROUND OF THE INVENTION

Mobile devices are rapidly evolving into all-purpose mobile personal computing machines. The style and presentation of the content displayed on mobile devices is increasingly becoming important and is a major differentiating aspect among the wide array of mobile devices available in the market. In this regard, a crucial component of mobile device presentation is the physical characteristics of its display.

Currently, displays in mobile devices are differentiated based on their resolution, brightness, and the number of colors that the display supports. For instance, several mobile phones in the market come with displays having 262,000 colors (e.g., Motorola V3) and a resolution of 640×200 (e.g., Nokia 9300). Rapid increases in technology are constantly improving the aforementioned aspects of mobile device display. However, all the above-mentioned displays are limited in a very fundamental way, namely these displays are all two-dimensional displays that are incapable of conveying stereo parallax to the human eye. This is because both human eyes typically see the same image on the two-dimensional display. As a result, a user does not perceive three-dimensional information due to the lack of a perception of depth.

Stated another way, the human visual system captures the world using two eyes. Since the two eyes are located at spatially distinct positions, the input to each eye is different. The human brain makes use of this difference while processing the input from the two eyes and derives a perception of depth. When human eyes observe a two-dimensional display, both eyes view the exact same image and hence the brain cannot perceive much depth even if the image on the display is that of a three-dimensional object. The lack of perception by human eyes to perceive three-dimensional information on two-dimensional displays that are incapable of conveying stereo parallax is a problem that has confounded the industry for a long time. Various stereoscopic technologies have evolved over the years in order to counter this problem. The goal of stereoscopic technologies is to provide different input to both eyes. Some of these stereoscopic technologies include active stereo systems such as shutter glasses and head-mounted displays. Stereoscopic technologies such as active stereo systems, have not made noticeable inroads into the consumer electronics industry due to significant shortcomings in the technology. For instance, as known to those skilled in the art, users typically consider stereo glasses to be intrusive and inconvenient to use while head-mounted displays are often considered to be too big and bulky for use. In contrast to active stereo systems, passive stereo systems do not require any such electronic eyewear. Passive stereo systems include simple stereo glasses such as anaglyphic glasses and polarized glasses, as well as autostereoscopic displays such as holographic displays, parallax barrier displays, and lenticular displays.

Autostereoscopic displays are often referred to as a special kind of passive stereo system which provides a different approach to stereoscopic display. Unlike active stereo systems, autostereoscopic displays have made steady inroads in consumer electronics. Autostereoscopic displays are fast gaining ground as the preferred stereoscopic display largely because of the non-intrusive nature of their use (e.g., a user is not required put on any eyewear) and also because the prices of these displays continue to decrease due to rapid technological advancements. Conventional displays are based on the principle of lighting a pixel by a color that is then diffused in all directions. As a consequence, the pixel appears to have the same color from most viewing angles. Autostereoscopic displays are based on a radically different principle. For instance, in autostereoscopic displays a pixel emits different light rays in different view angles/zones. This property of an autostereoscopic display allows applications such as, user interface widgets, games, maps, calendars, address books, advertisements, web browsers, file browsers, and stereo image and viewers, to emit a different image to the left and the right eye and to convey a perception of depth to a viewer such as a user.

As fully appreciated by those skilled in the art, autostereoscopic displays can be categorized into three categories such as: 1) two-view displays, 2) head-tracked two-view displays, and 3) multi-view displays. The principles of a two-view display are illustrated in FIG. 1. As shown in FIG. 1, a two-view display ensures that each of its display elements sends out separate light towards the left and the right eye. While there is a specific 'sweet spot' where stereovision is best available, two-view displays typically provide leeway for a larger view-zone where the stereo image pairs can be viewed. On the other hand, when a user steps out of a view zone then he/she may not perceive a meaningful stereo effect. This lack of perception of a meaningful stereo effect may typically be countered by a second category autostereoscopic display, namely a head-tracked two-zone stereo display. The main basic concept of a head-tracked two-zone stereo display is to track the relative position of both eyes with respect to the display using sensors such as 3D trackers. A computer uses the tracked information to determine the appropriate images for the left and the right eye. As known to those skilled in the art, a head-tracked two-zone stereo display does not provide a robust technique for viewing 3D images and head-tracked two-zone stereo displays do not allow multiple viewers to view the same display.

The third category of autostereoscopic displays, namely multi-view displays will now be discussed. Multi-view displays are similar in principle to two-view displays except that each display element of the display sends out a different light ray in more than two directions. If these light rays are coordinated to represent the underlying scene, then stereovision can be perceived in each of the view zones. FIG. 2 shows an example of a three-view display having four viewpoints. Since there are multiple viewpoints (i.e., four) in the three-view display of FIG. 2 whenever the left and the right eye of a user are in two different view zones, the user is still able to perceive stereovision.

One of the earliest forms of autostereoscopic displays are the holographic displays. Holographic displays function through the interference of two light waves, namely a reference wave and a representative wave. The representative wave is a complex wave that is computed by a processor from the shape of the object to be displayed. The two light waves are projected to interfere in specific patterns using a fringe display. This special interference produces a diffraction pattern that resembles the image to be displayed. Amongst all the autostereoscopic display technologies currently available, holographic displays offer the most potential to be a truly volumetric display since they are not limited by resolution and are naturally three-dimensional displays. Nevertheless, holographic displays face significant challenges in terms of the amount of computation that they require and the amount of data that they need to process. Additionally, holographic display technology is still in its infancy and has limited color and resolution capabilities. Due to the challenges posed by holographic displays, these displays are considered to be in the experimental stages of evolution.

Consideration will now be given to another type of autostereoscopic display, namely a parallax display. Parallax displays are much older than holographic displays and they are more popular than holographic displays since they are cheap and are typically considered to be more robust than holographic displays. As shown in FIG. 3, parallax barrier displays have tiny opaque barriers in front of a display. The display behind the barrier displays two sets of images that are uniformly juxtaposed (i.e., interlaced) along their columns. The barriers are designed to occlude the outgoing light from the display in such a way that each eye sees only one image and does not see the pixels of the other image. In other words, a left image and a right image are interlaced so that the user may view the image on the parallax barrier display, as illustrated in FIG. 4. If the two images presented on the display correspond to the views of a scene as seen from the left and the right eyes respectively, then the user perceives a stereoscopic sight. Multi-view parallax barriers are currently in existence and they operate under a similar principle to that of a single zone parallax barrier display. For instance, with respect to an N-view parallax display, N+1 images are uniformly interlaced along their columns and are presented on the display that stands behind the parallax barrier. There are several parallax barrier displays currently in the market, one of which is manufactured by Sharp Electronics.

Another type of autostereoscopic display, namely a lenticular display will now be considered. As shown in FIG. 5, lenticular displays achieve the effects of parallax barrier displays by using optical lens placed in front of the display. With respect to a two-view lenticular display, there are two pixels of the display for each individual lens. The lenses are designed so that the left eye only sees the pixels corresponding to the left image while the right eye sees the corresponding pixels of the right image. In practice, the lenticular lenses of a lenticular display are long cylindrical lenses in front of the display. The lenticular display framework of FIG. 5 can be further expanded to multi-view lenticular displays by using more than two pixels under one lenticular lens. Both the parallax (discussed above and illustrated in FIGS. 3 and 4 respectively) and lenticular displays are somewhat limited in that these displays only offer horizontal stereovision. That is to say, there are no vertically aligned view zones provided by the parallax and lenticular displays of FIGS. 3 and 5. As a consequence, if a user moves his/her head up and down, then he/she is likely to see the same image and, thus does not perceive a meaningful stereoscopic effect. A significant advantage of lenticular displays over parallax barrier displays is that in addition to horizontal stereo, lenticular displays can offer vertical stereo effects. For instance, this can be achieved by modifying the lenticular display of FIG. 5 such that it uses a two-dimensional array of hemispherical (or near hemispherical) lens as opposed to the 1D (dimensional) array of long cylindrical lenses used for the two-view case described above.

There are several autostereoscopic displays in the market. These autostereoscopic displays include Mitsubishi LCD 4000, Sharp PC-RD-3D, Sharp LL-151D, with more products being developed from companies such as Phillips and Toshiba. Additionally, in 2003, NTT DoCoMo introduced a mobile phone (e.g., Mova SH505i) with an autostereoscopic display.

Initially, the cost of existing autostereoscopic displays was quite prohibitive. However, currently these displays are available for ordinary desktops and notebooks at an affordable price. The cost of existing autostereoscopic displays is expected to decrease significantly in the immediate future. In this regard, NTT DoCoMo introduced a mobile phone (e.g., Mova SH505i) with autostereoscopic display in 2003.

Autostereoscopic displays do not require power in excess of power required by conventional liquid crystal displays (LCDs) since autostereoscopic displays are fundamentally based on placing optical barriers or lenses in front of other types of conventional displays. Because of the benefits of autostereoscopic displays, these displays are expected to make a big impact in the mobile device market in the foreseeable future. Furthermore, the rapidly decreasing cost of autostereoscopic displays makes them an ideal new display technology for mobile devices. Autostereoscopic displays offer a generational upgrade in mobile display technology. The user interface as currently known will be upgraded by a whole new dimension to 3D (Three Dimensional). This upgrade affects a wide range of applications such as 3D video conferencing, 3D user interface, and stereoscopic games and they are expected to radically improve the presentation of mobile applications such as maps, calendars, address books, advertisements, image viewers, message viewers and the like. For example, displays employing autostereoscopic technology may enable a message viewer to display text messages using messages in 3D fonts. Similarly, displays using autostereoscopic technology may allow calendars to illustrate 3D image features such as, for example, multiple appointments using floating calendar features that come into focus as a user evinces an interest in viewing the appointment. Additionally, autostereoscopic displays may enable advertisements to include fancy 3D graphics in order to entice a user to view the advertisement. In light of the benefits of autostereoscopic displays, one can easily understand how 3D graphics rendering may be a critical component of mobile device technology.

Graphics traditionally has been driven by monoscopic displays which are typically designed for rendering from a single viewpoint. Consequently, most of the rendering algorithms and specialty graphics hardware currently available are geared towards handling a monoscopic rendering scenario. Even so, current standards and rendering hardware still provide mechanisms for rendering to stereo displays. For instance, existing approaches to rendering stereo display mainly involve a bare bone system that invokes the traditional monoscopic rendering system multiple times, namely once for each viewpoint. As such, while it is possible to render to stereoscopic systems using a monoscopic rendering system, it is very expensive to do so because of the high computational load associated with rendering multiple times for multiple viewpoints.

Consider the conventional rendering system of FIG. 6 in which rendering of three-dimensional content follows a highly parallel and deeply pipelined model. Since graphics rendering is a highly computationally intensive task, in modern computers a majority of the computations are done in a special hardware unit called a Graphics Processing Unit (GPU). Similar graphics-specific hardware exists in mobile SoCs (System-On-Chips) such as Texas Instruments (TI) Open Multimedia Applications Platform (OMAP) 2420 and mobile phones with such hardware are currently available from companies such as LG and Samsung. As referred to herein, a GPU encompasses graphics hardware on a computer and/or on a mobile device. Currently, GPUs such as, for example, Nvidia GeForceFX 7800 are designed for monoscopic rendering.

Geometric content in three-dimensional graphics is traditionally represented as a triangle mesh. A triangle mesh is a set of adjoint triangles in 3D space that share common vertices between them and is typically used to represent the area of an image. Open Graphics Library (OpenGL) is an industry standard (see, e.g., *The OpenGL® Graphics System: A Specification Version* 2.0, Oct. 22, 2004, the contents of which are hereby incorporate by reference in its entirety) for rendering 3D graphics content which follows the pipelined rendering model illustrated in FIG. 6. In this model, a central processing unit (CPU) 2 sends the triangles for rendering by sequentially sending information regarding the three vertices of each triangle in the mesh to the GPU 5. As understood to those skilled in the art, the triangle data can alternately be DMA (direct memory accessed)-transferred from the system or graphics memory after initiation from the CPU 2. Upon receipt of the vertices corresponding to a triangle, the GPU 5 dispatches these vertices to a vertex processing unit 4 having vertex shaders (not shown) in which per-vertex computation such as transformation and lighting are performed. The vertex shaders are programmable Multiple Instruction Multiple Data/Single Instruction Multiple Data (MIMD/SIMD) processors that can be programmed with languages such as, for example, an Open GL Shading Language (GLSL). Since there are typically multiple vertex shaders in a GPU, multiple vertices can be processed in parallel. The vertex shaders typically share a common set of input and output registers (not shown). For a vertex to be processed by a vertex shader, the attributes of a respective vertex, such as position and color, are written into input registers of a corresponding vertex shader. The vertex shader then uses this per-vertex information along with some pre-defined information to process the vertex. The processed vertex is then output to a respective output register. In like manner, each of the vertex shaders process the respective input vertices and outputs the vertices with new attributes, such as diffuse color, along the pipeline. For instance, after all three vertices of a triangle are processed they are assembled together to form a triangle by the primitive assembler 6. For each such assembled triangle, a rasterizer 8 determines the screen pixels that the triangle occupies and interpolates the three vertex attributes to determine the attributes of these pixels (e.g., diffuse color). The screen pixels are sent to a pixel processing unit 11 having pixel shaders (not shown) which operate on each of the screen pixels and compute the final color (e.g., specular plus diffuse color) and depth at a respective pixel. Subsequently, the pixels may go through a series of tests such as the stencil test, the alpha test, and the depth test, and if they pass all the tests they are written to a buffer 15 (with blending if enabled) (buffer 15 may also be referred to as original pixel buffer herein). After all the triangles are rendered, the resultant image is sent to the display device 17 where a corresponding image is displayed.

While the conventional GPU 5 of FIG. 6 is a model that fits well for monoscopic rendering, it is highly inefficient for stereoscopic rendering in which rendering for multiple viewpoints is required. This is because the vertex and pixel shaders do not have a capability to output viewpoint-dependent information such as illumination and projection. In this regard, the rendering approach of a conventional GPU is capable of achieving stereo display, but it is very costly to utilize a conventional GPU to achieve stereo display. This notion is especially true for mobile devices where most 3D applications are hard pressed to achieve rendering speeds of 15 frames per second. For example, in situations where stereoscopic displays utilize a monoscopic rendering system, 3D application speed is typically reduced at least by half, thus making such stereoscopic displays unpleasant to use. In addition to this undesirable scenario, some multi-view autostereoscopic displays might have many more viewpoints making rendering to such displays all the more slower due to the high computational load associated with rendering each viewpoint. As known to those skilled in the art, a 3D rendering framework typically serves as the core backbone of a user interface for autostereoscopic devices and if the 3D rendering framework has a high computational load, it is bound to consume mobile device resources and drain the battery life of a mobile device very quickly resulting in user dissatisfaction.

Given the above-described problems, current rendering technologies require a radical revamping to ensure that current rendering technologies are more efficient for autostereoscopic displays. While there is currently no way to overcome the fact that multiple views need to be rendered in a 3D rendering system, there is enough coherence in the computations required for rendering to multiple viewpoints which can be exploited. This is because most of the viewpoints of autostereoscopic displays are quite close spatially. Consequently, an object that is visible in one view is very likely to be visible in another view, although some parts of that object may not be visible in both views. Moreover, the illumination of the object is likely to be similar in the two views as well. Hence, the rendering computation made for rendering one viewpoint can be leveraged for rendering another viewpoint. In this regard, it may be advantageous to generate a method which leverages on the coherence of rendering for different viewpoints to reduce rendering speed, power consumption and bus bandwidth of an electronic device such as, for example, a mobile device.

BRIEF SUMMARY OF THE INVENTION

A method and apparatus to implement a new GPU architecture are therefore provided. The new GPU architecture leverages on the computational coherence when rendering to multiple viewpoints and is based on adding viewpoint-dependent computational capability to vertex shaders, a primitive replication unit, and a pixel buffer replication mechanism. The new GPU architecture ensures that the most common computations and memory fetch requirements for the various viewpoints are performed only once and it thereby serves to reduce computation, power consumption, and bus bandwidth consumption of graphics applications. The new GPU architecture can be incorporated into the next-generation of GPUs.

Additionally, a method, apparatus and computer program product are provided in which GPU architecture causes a monoscopic graphics application running on the current generation of GPUs to output stereoscopic images on a display. Such a mechanism lowers the cost of devices with stereoscopic displays and also helps graphics applications written for monoscopic applications to be easily converted into stereoscopic applications. To achieve this result, a modified graphics rendering pipeline is provided that adds software and/or hardware components around existing GPUs.

In one exemplary embodiment, a method and apparatus (including a processing element) for rendering graphics are provided. The method and apparatus receive vertices corresponding to one or more primitives. The method and apparatus then access viewpoint-dependent information corresponding to a plurality of viewpoints based on the received vertices. The method and apparatus thereafter calculate viewpoint-independent data for the plurality of viewpoints based on the received vertices to obtain viewpoint-independent calculation results. This calculation of the viewpoint-independent data is performed a fewer number of times than the number of viewpoints, such as by calculating the viewpoint-independent data once for a plurality of viewpoints.

In another exemplary embodiment, a method for rendering graphics is provided. The method defines a projection matrix corresponding to a number of a plurality of viewpoints. The method replicates at least one primitive, based on received vertices, a number of times corresponding to the number of viewpoints to obtain a plurality of replicated primitives. Each of the plurality of replicated primitives may then be assigned a first identifier which specifies a respective one of the plurality of viewpoints to which each of the plurality of replicating primitives correspond to.

In another exemplary embodiment, a computer program product (including at least one computer-readable storage medium having computer-readable program code portions stored therein) for graphics rendering is provided. The computer program product receives a plurality of vertices corresponding to at least one primitive. The computer program product then calls a function, corresponding to a graphics rendering framework, to replicate the primitive a number of times corresponding to the number of viewpoints to obtain a plurality of replicated primitives. The computer program product thereafter stores the plurality of replicated primitives as a plurality of vertices arranged in an array.

In another exemplary embodiment, a method for rendering graphics is provided. The method includes receiving vertices corresponding to at least one primitive. The method further includes calling a call function corresponding to a graphics rendering framework. The call function relates to monoscopic graphics rendering. The method further includes receiving the call function and modifying the call function to effectively display to a plurality of viewpoints. In this regard, an exemplary embodiment of the invention is capable of driver modification and graphics framework call interception.

In another exemplary embodiment, a system for rendering graphics is provided. The system includes means for receiving vertices corresponding to one or more primitives. The system further includes means for accessing viewpoint-dependent information corresponding to a plurality of viewpoints based on the received vertices. The system further includes means for calculating viewpoint-independent data for the plurality of viewpoints based on the received vertices to obtain viewpoint-independent calculation results, wherein the viewpoint-independent data is calculated a fewer number of times than the number of viewpoints.

In another exemplary embodiment, a method for graphics software development is provided. The method includes guidelines for modifying a monoscopic application to render to a plurality of viewpoints using a GPU designed for rendering to a singular viewpoint.

In another exemplary embodiment, a method for rendering is provided. The method includes intercepting one or more call functions, corresponding to a graphics rendering framework, received from a call library. The one or more call functions comprise monoscopic call functions. The method further includes determining whether the one or more call functions may be converted into one or more respective stereoscopic call functions to obtain the desired results. The method further includes converting the one or more call functions into the one or more respective stereoscopic call functions based on the determination results.

BRIEF DESCRIPTION OF THE SEVERAL VIEWS OF THE DRAWINGS

Figure 1:
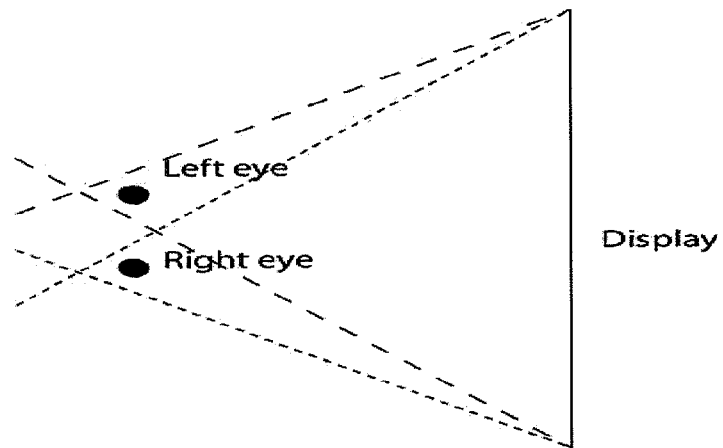
Figure 2:
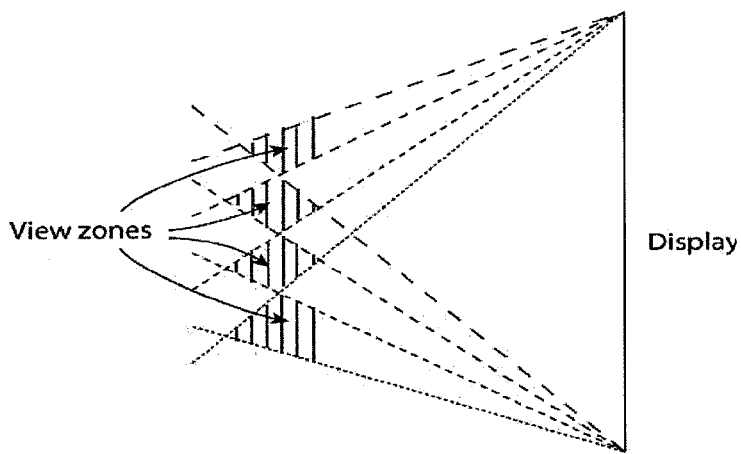
Figure 3:
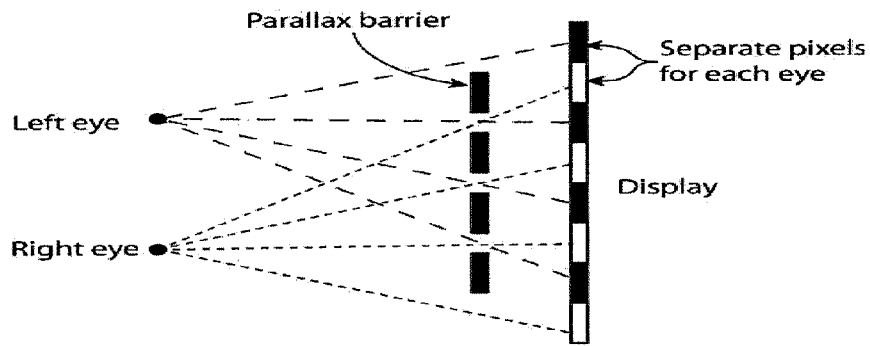
Figure 4:
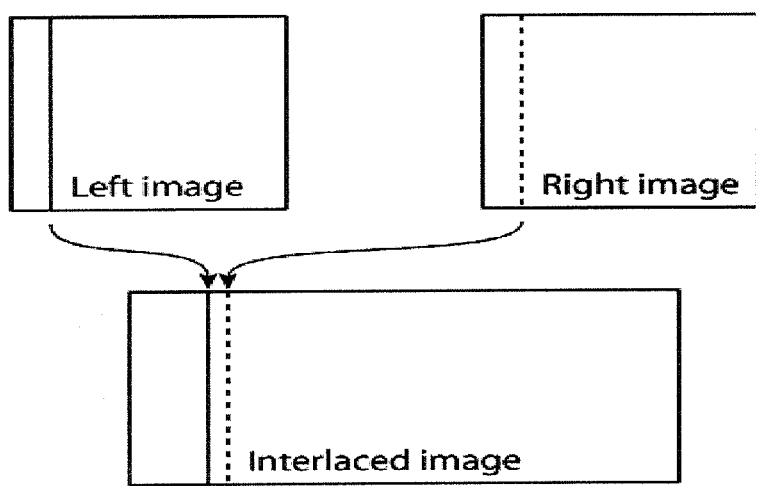
Figure 5:
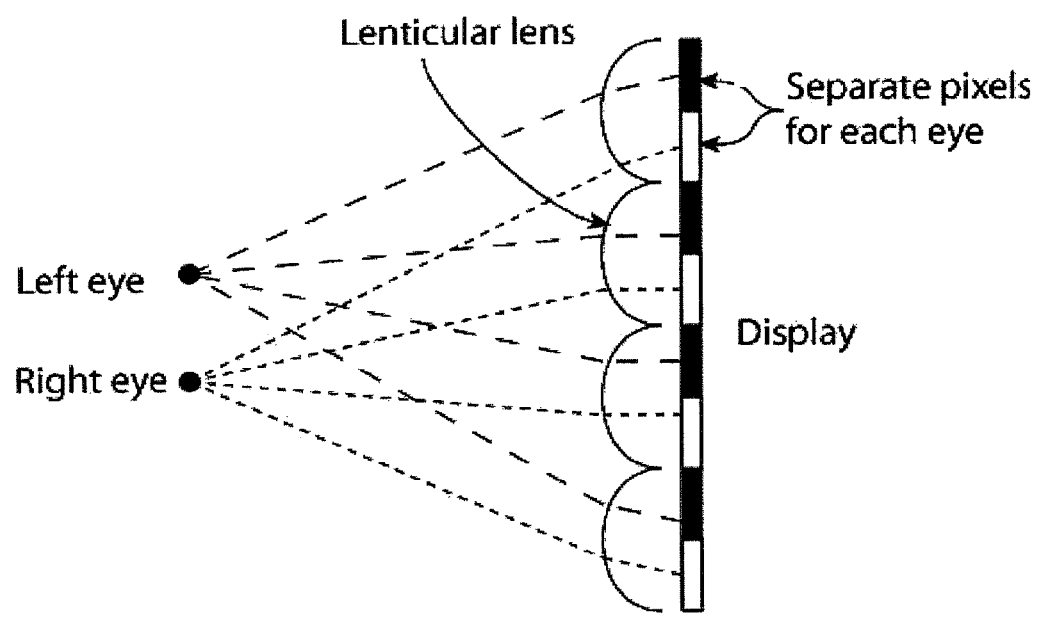
Figure 6:
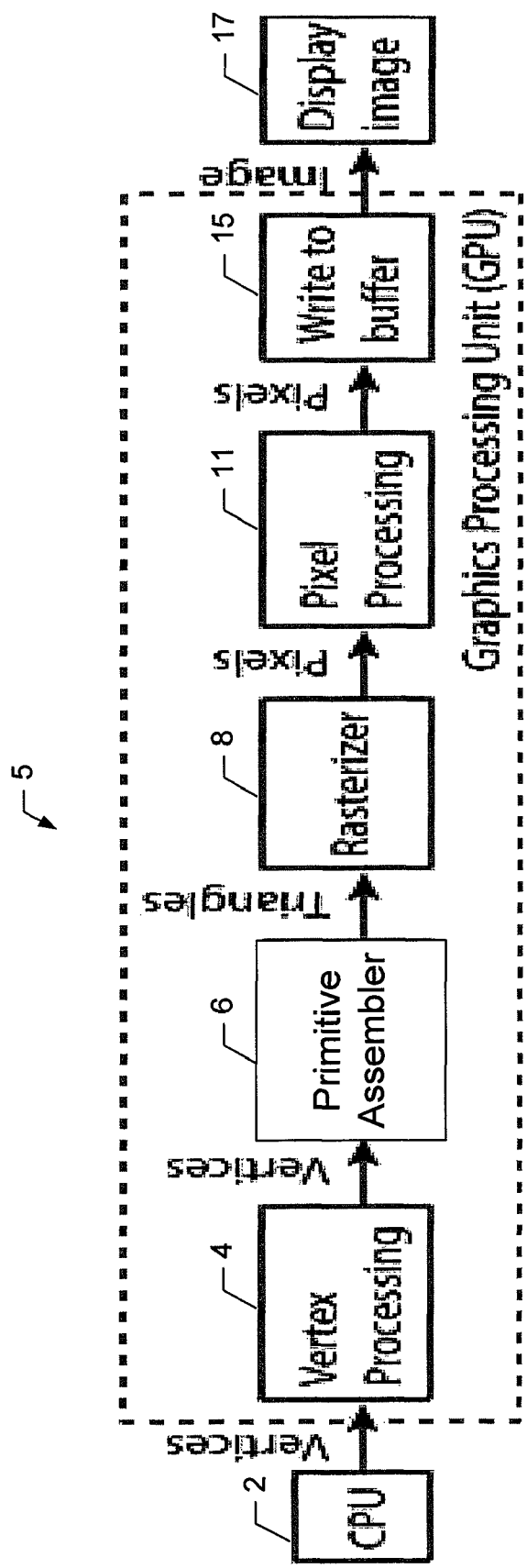
Figure 7:
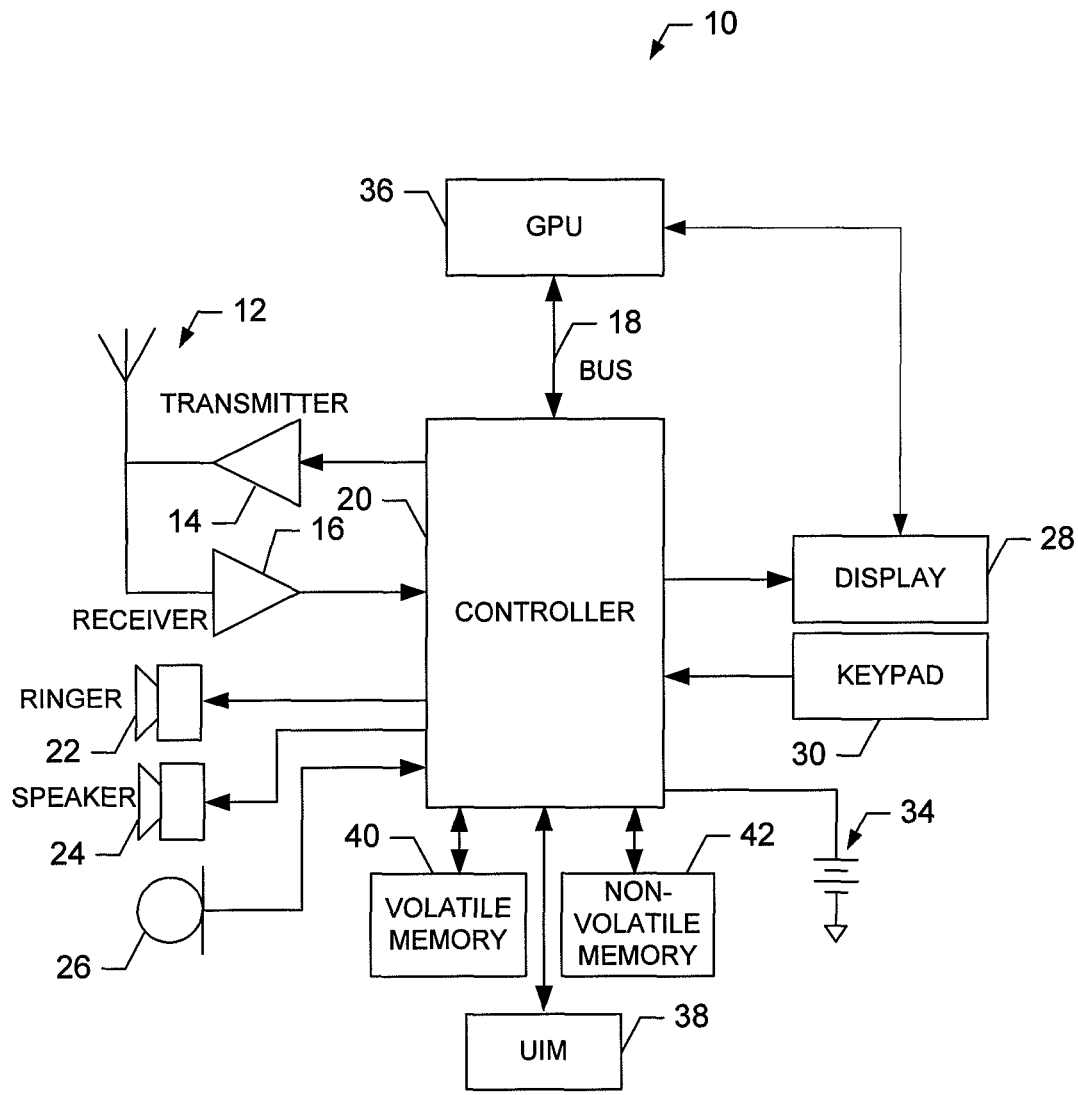
Figure 8:
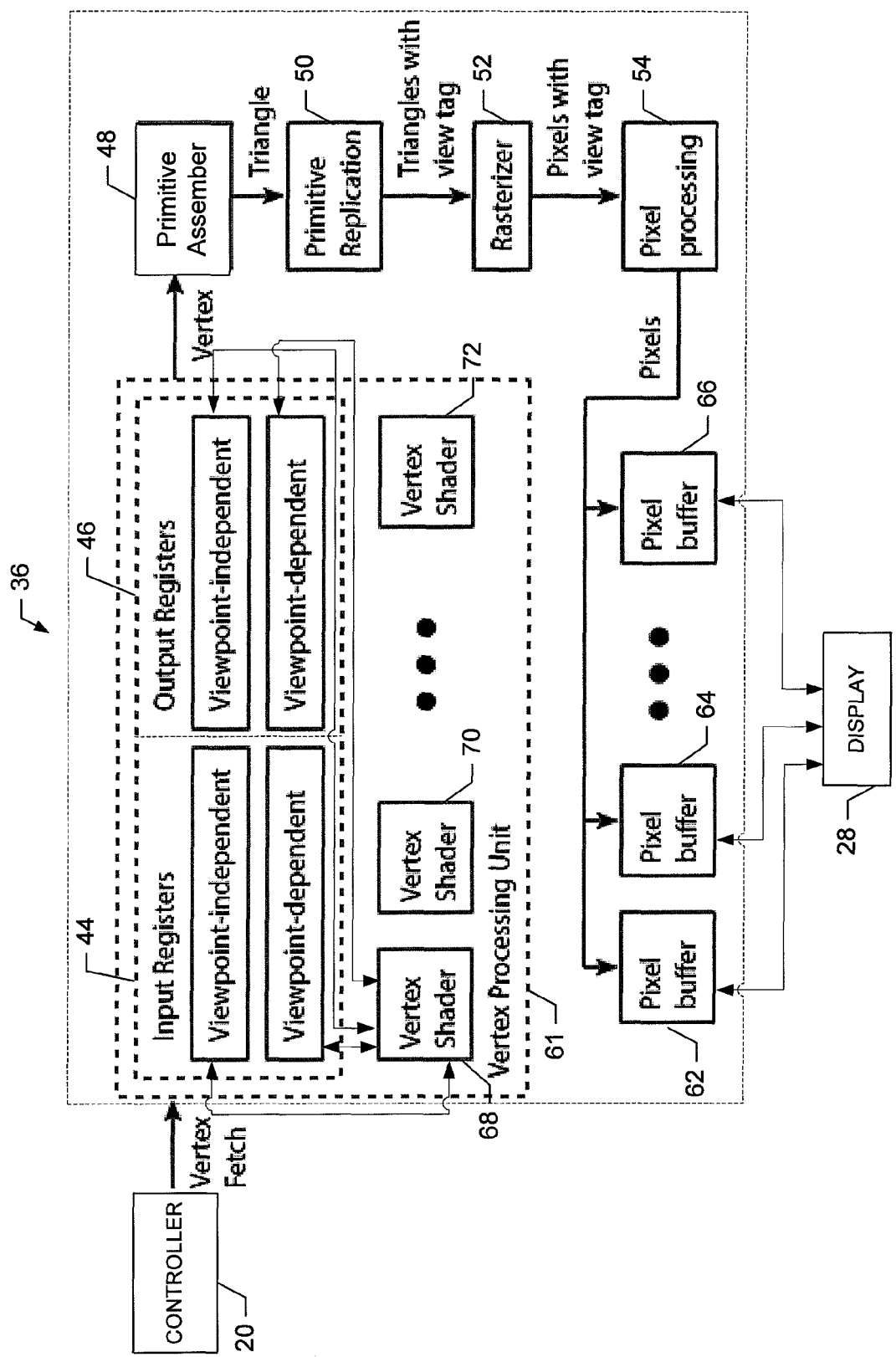
Figure 9:
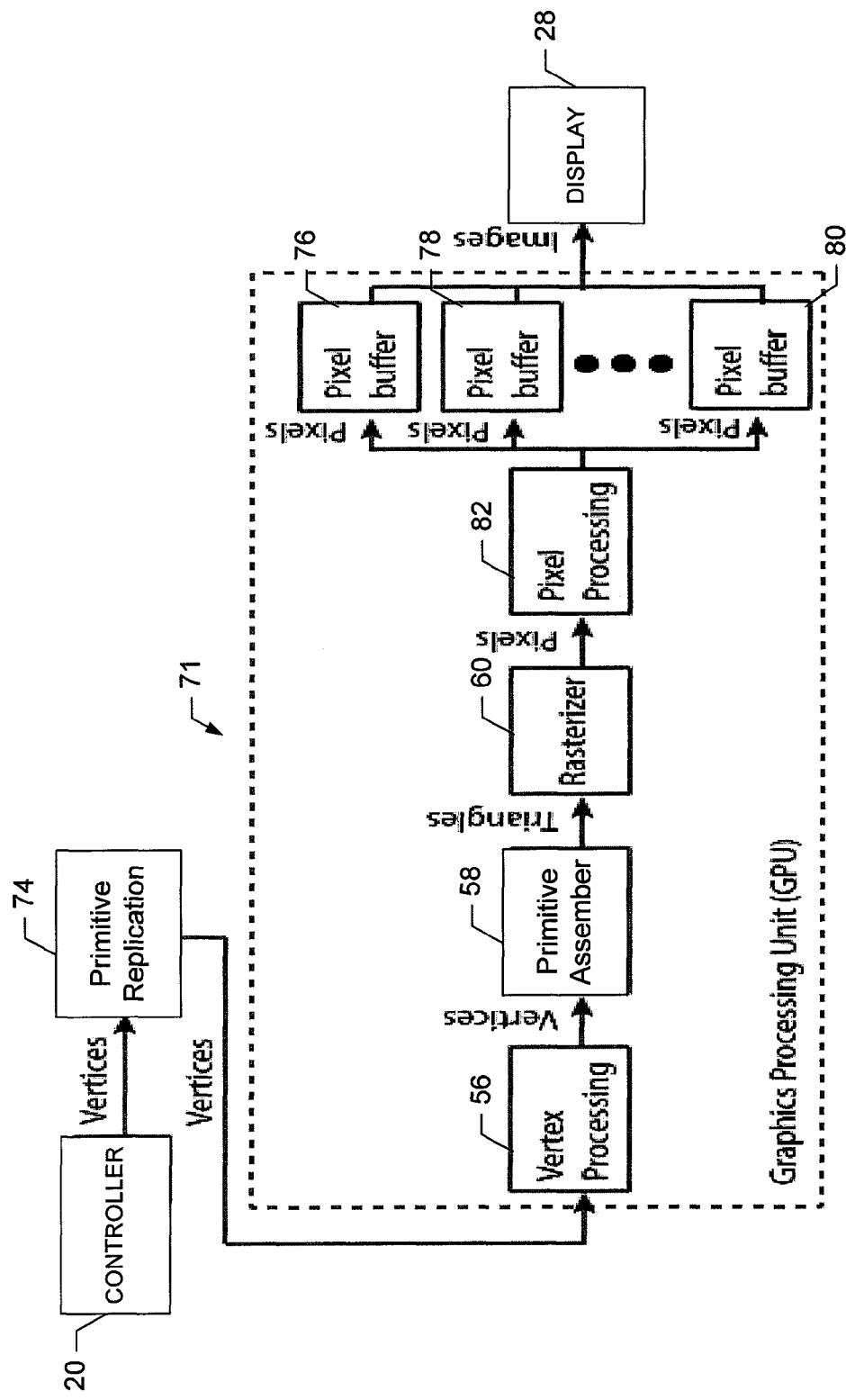
Figure 10:
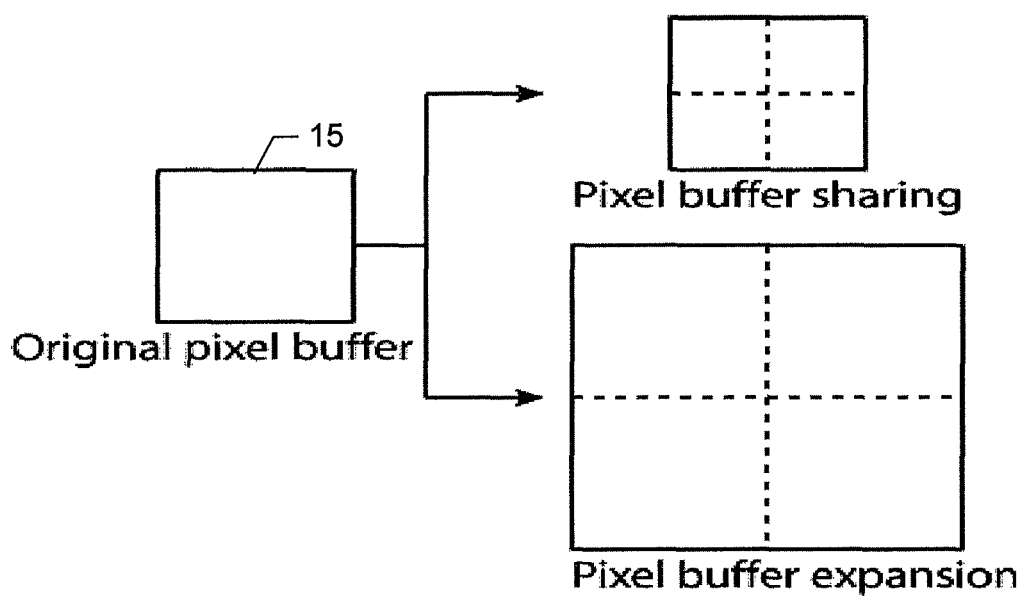
Figure 11:
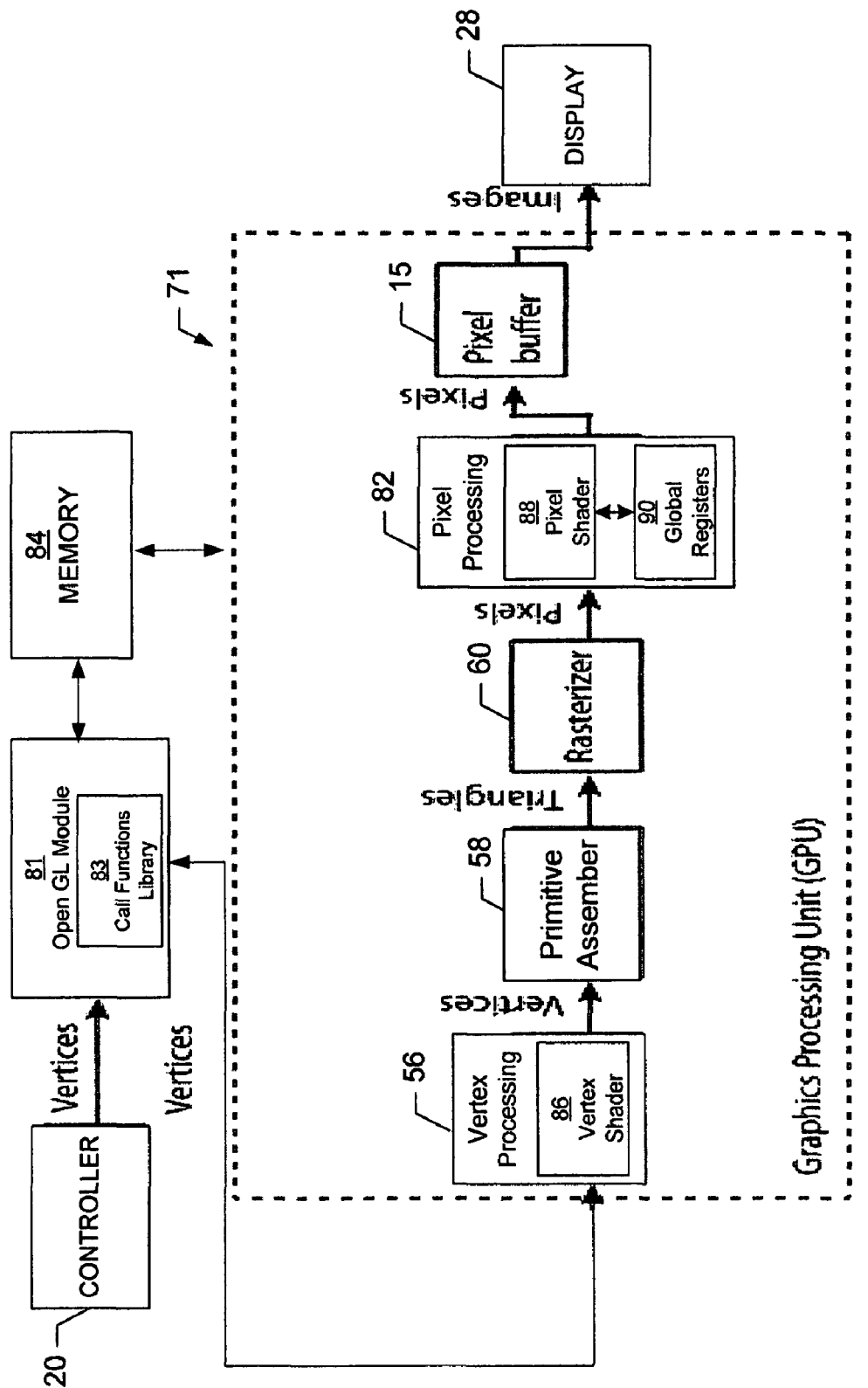
Figure 12:
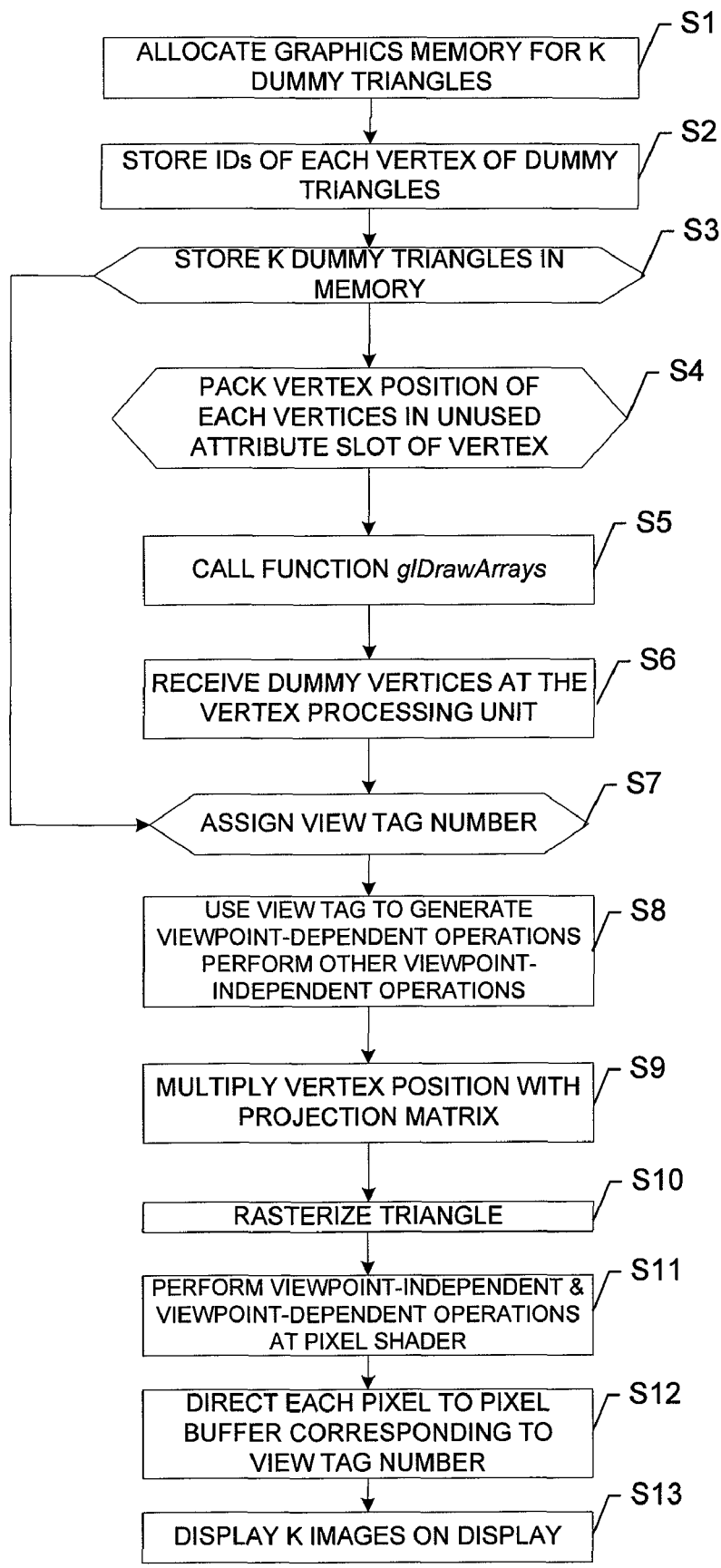
Figure 13:
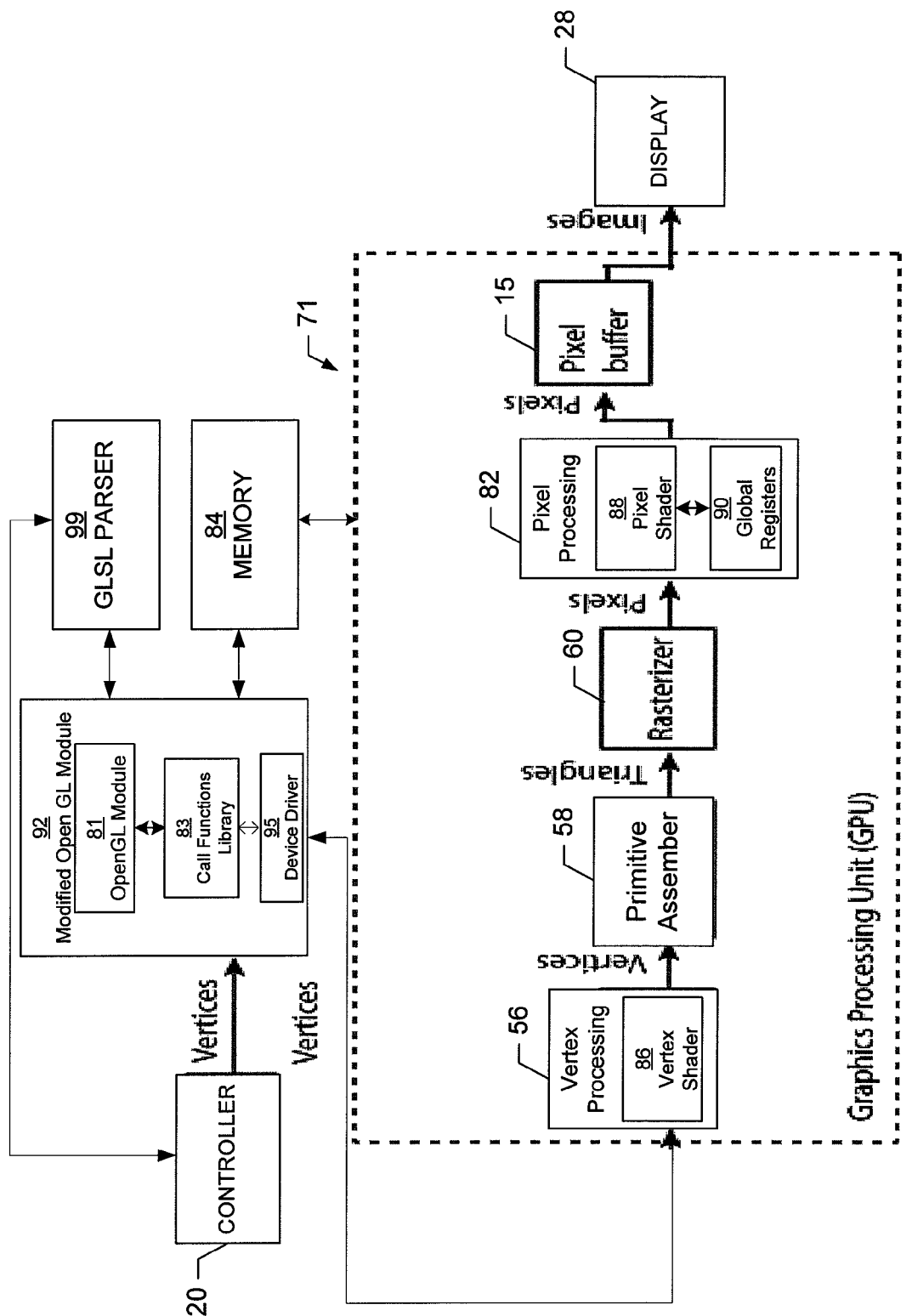
Figure 14:
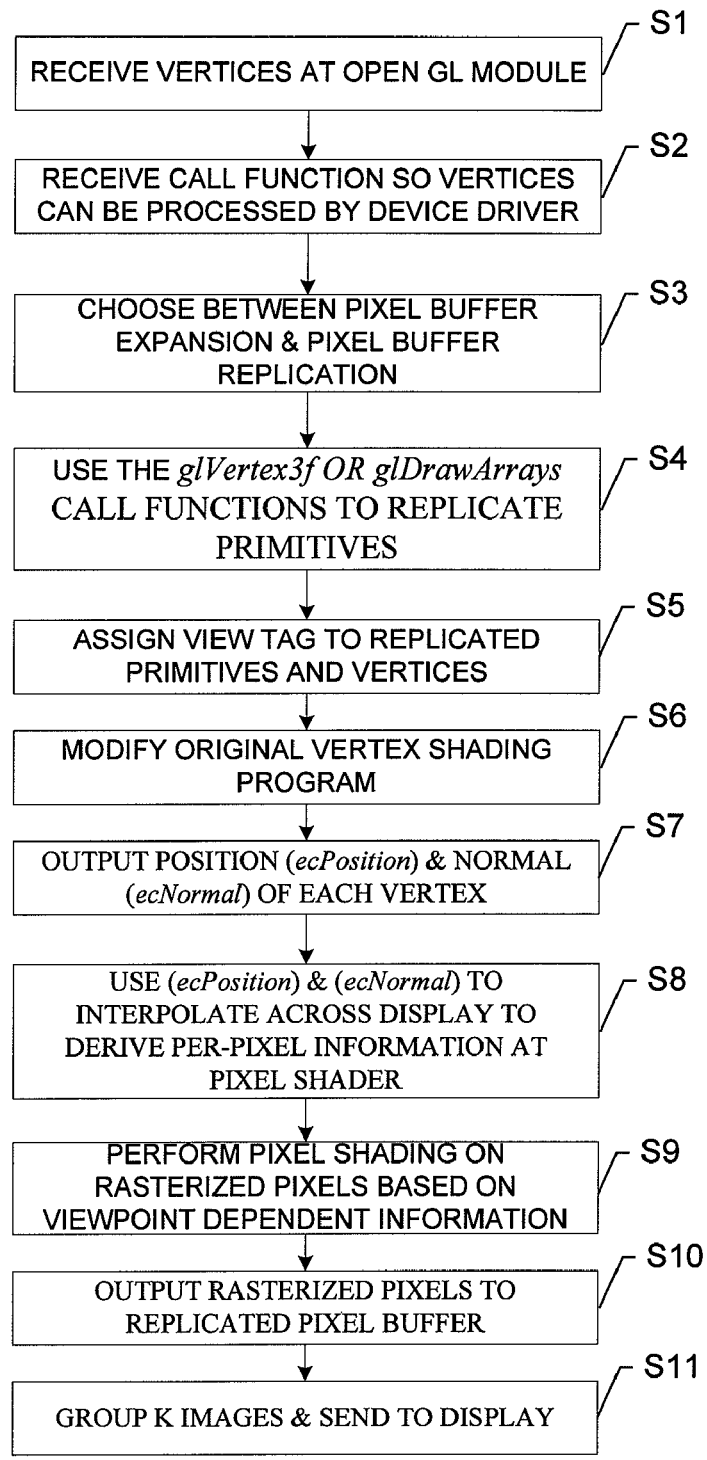

Having thus described the invention in general terms, reference will now be made to the accompanying drawings, which are not necessarily drawn to scale, and wherein:

FIG. 1 is a diagram of a conventional autostereoscopic display;

FIG. 2 is diagram illustrating a conventional three-view display system having four rendering viewpoints;

FIG. 3 is a diagram illustrating a conventional parallax barrier display;

FIG. 4 is a diagram illustrating interlacing of left and right images for viewing on a conventional parallax barrier display having two viewpoints;

FIG. 5 is a diagram illustrating a conventional lenticular display;

FIG. 6 is a diagram illustrating a graphics pipeline for triangle rendering according to a conventional Graphics Processing Unit;

FIG. 7 is a schematic block diagram of a mobile terminal according to an exemplary embodiment of the present invention;

FIG. 8 is a diagram illustrating a system having a Graphics Processing Unit according to an exemplary embodiment of the present invention;

FIG. 9 is a diagram illustrating a system having a modified rendering pipeline for stereoscopic rendering on existing Graphics Processing Units;

FIG. 10 is a diagram illustrating pixel buffer replication for a stereoscopic display having four viewpoints according to an exemplary embodiment of the present invention;

FIG. 11 is a diagram illustrating a system which provides an exemplary embodiment of a framework of the present invention that enables a software developer to modify software code that is originally written for monoscopic rendering in order to generate stereoscopic images according to the modified graphics rendering pipeline of FIG. 9;

FIG. 12 is a flowchart of a method for implementing the system of FIG. 11;

FIG. 13 is a diagram illustrating a system which provides an exemplary embodiment of the present invention for modifying a graphics driver so that it can accept commands from graphics applications designed for monoscopic rendering and process these commands in such a way that stereoscopic images are rendered;

FIG. 14 is a flowchart of a method for implementing the system of FIG. 13.

Figure 15:
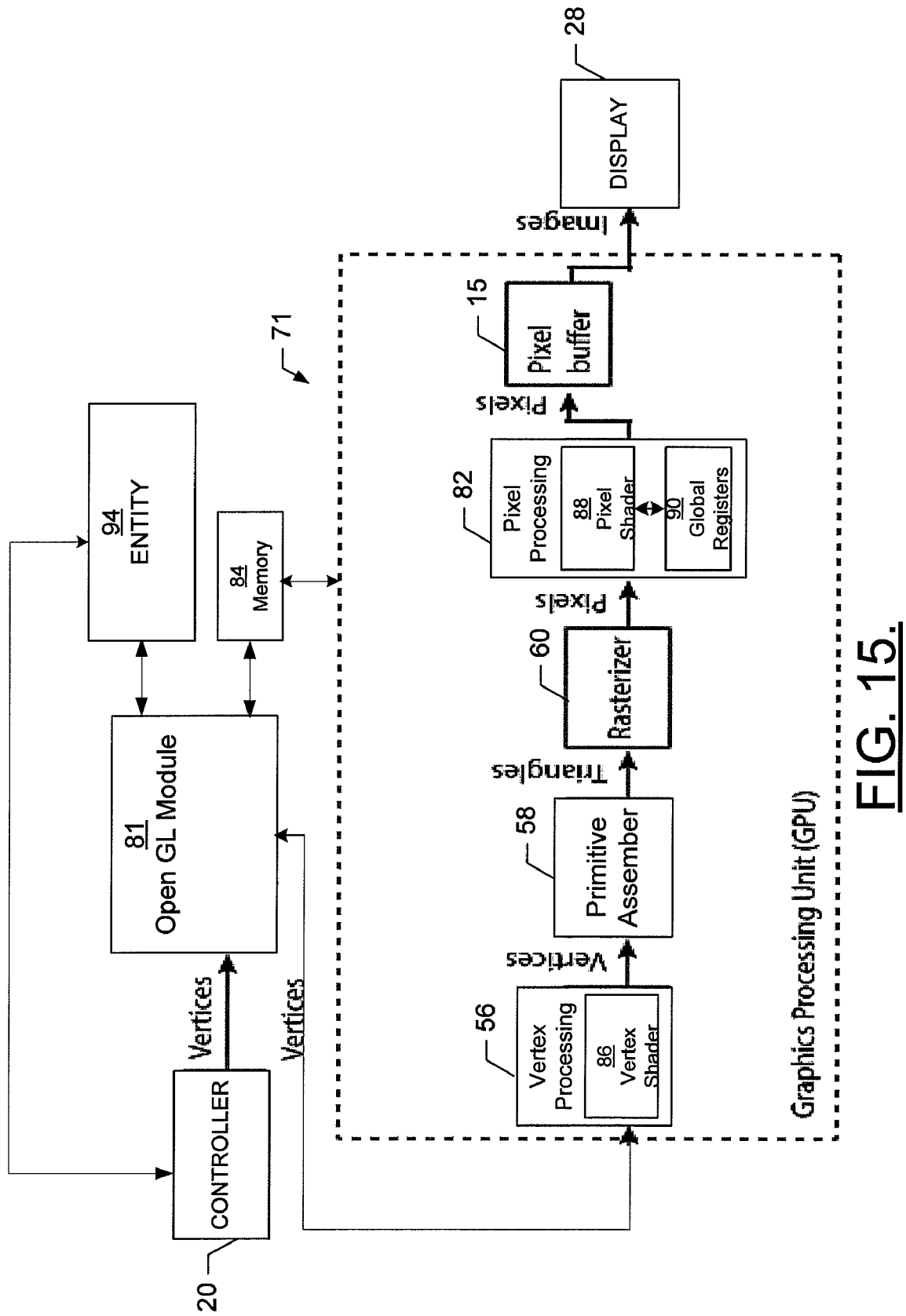
Figure 16:
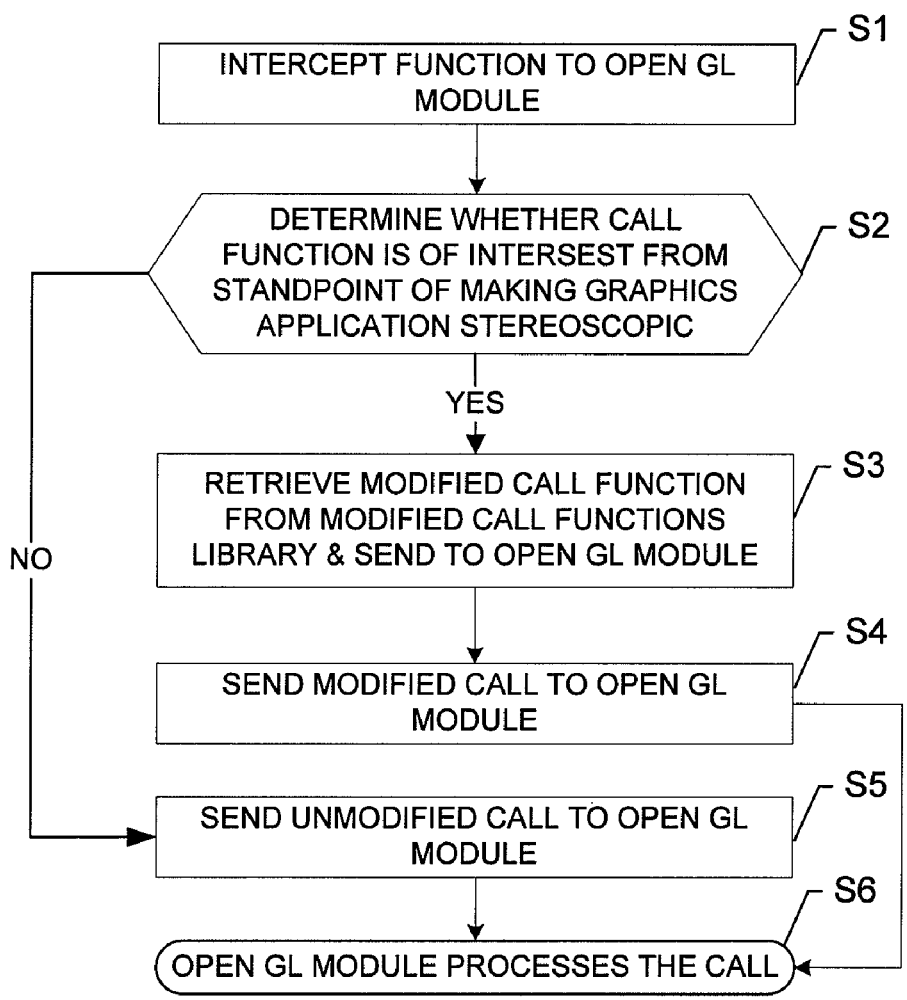
Figure 17:
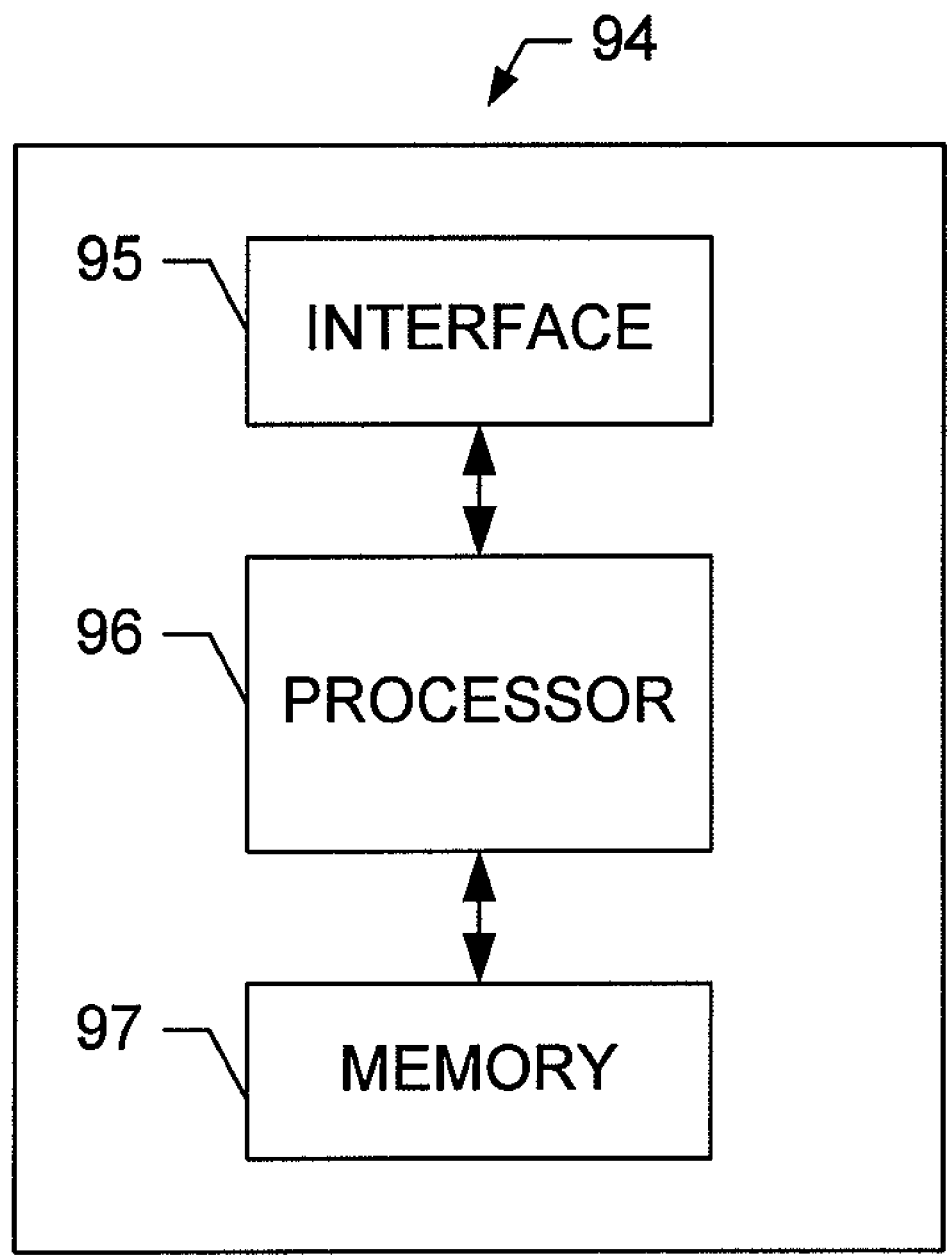
Figure 18:
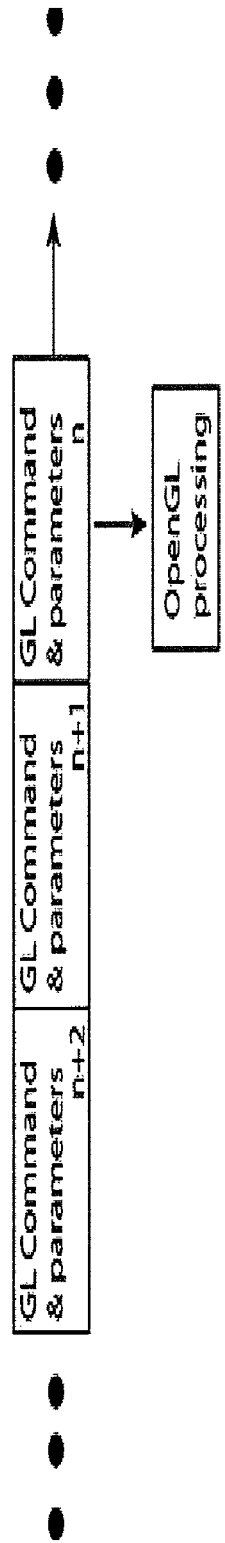

FIG. 15 is a diagram illustrating a system, according to an exemplary embodiment of the present invention, which intercepts graphics rendering framework function calls and modifies them so that the graphics application effectively transmits the correct OpenGL calls for stereoscopic rendering;

FIG. 16 is a flowchart of a method for implementing the system of FIG. 15;

FIG. 17 is a schematic block diagram of an entity according to an exemplary embodiment of the present invention; and FIG. 18 is a diagram illustrating a conventional OpenGL stream processing model.

DETAILED DESCRIPTION OF THE INVENTION

Embodiments of the present invention now will be described more fully hereinafter with reference to the accompanying drawings, in which some, but not all embodiments of the inventions are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As pointed out above, graphics rendering follows a highly pipelined rendering model as shown in the conventional GPU of FIG. 6. Currently graphics rendering frameworks such as OpenGL and DirectX, which is a graphics rendering framework developed by Microsoft Corporation, are geared for rendering from a single viewpoint, as described above. For instance, in the conventional graphics rendering pipeline of FIG. 6, a primitive, which may be, for example, a line, circle, point, polygon, etc. corresponding to an area in an image or a scene, enters the rendering pipeline once and is processed through the different stages of the pipeline. The pixels that correspond to the area that the primitive occupies (which corresponds to a single viewpoint) are colored and written to a buffer such as buffer 15. Embodiments of the present invention provide an approach for rendering to multiple viewpoints using a different GPU architecture. In this regard, an exemplary embodiment of the present invention provides a GPU architecture for stereoscopic rendering without the need for performing monoscopic rendering multiple times. Additionally, exemplary embodiments of the present invention provide modifications to conventional GPUs which generate a modified rendering pipeline that adds software components around conventional GPUs to enable stereoscopic rendering.

Exemplary embodiments of the present invention, in large part, achieve stereoscopic rendering by replicating a rendering primitive K times (once for each viewpoint) and by maintaining K different output buffers (e.g., one buffer for each viewpoint). Exemplary embodiments of a modified rendering pipeline are based on software code modification, graphics driver modification, and graphics command stream processing, which will be discussed below in greater detail, but first the following terms as used herein will be defined as follows.

Graphics Processing Unit (GPU): A GPU is hardware or a software solution that processes raw points, 1D, 2D and/or 3D content (e.g., triangles). A GPU is generally used for rendering 3D content from a given viewpoint.

Graphics framework: A graphics framework is an Application Program Interface (API) that an application can use to display 3D content. Popular graphics frameworks include OpenGL (an industry standard) and Microsoft DirectX.

Graphics driver: A graphics driver is a device driver that accepts API calls made to the graphics framework by an application and sends the appropriate information to a GPU.

Rendering primitive: Rendering primitives are basic building blocks that are used to describe complex graphical objects. Rendering primitives include, but are not limited to, points, lines, circles, spheres, planes, triangles, triangle strips, and polygons.

Viewpoint: A viewpoint refers to one of the positions of a virtual eye from which a scene or image has to be rendered.

Stereoscopic display: A stereoscopic display is any display device that intends to send different images to each human eye. Stereoscopic displays include, but are not limited to, shutter glass display systems, head mounted displays, and autostereoscopic displays.

K: The number of viewpoints that a stereoscopic display supports.

Pixel processing: Pixel processing includes processing of a rasterized pixel by a pixel shader (also referred to in the art as a fragment shader) and pixel processing also includes pixel operations such as stencil test, depth test, and blending.

Pixel buffer: A pixel buffer is a set of buffers including but not limited to, a color buffer, a depth buffer, and a stencil buffer. A pixel buffer also holds per-pixel information of the GPU during rendering.

Referring now to FIG. 7, an illustration of a block diagram of a mobile terminal 10 that would benefit from embodiments of the present invention is provided. It should be understood, however, that a mobile telephone as illustrated and hereinafter described is merely illustrative of one type of mobile terminal that would benefit from embodiments of the present invention and, therefore, should not be taken to limit the scope of the present invention. While several embodiments of the mobile terminal 10 are illustrated and will be hereinafter described for purposes of example, other types of mobile terminals, such as portable digital assistants (PDAs), pagers, mobile televisions, laptop computers and other types of voice and text communications systems, can readily employ the present invention. Furthermore, devices that are not mobile may also readily employ embodiments of the present invention.

In addition, while several embodiments of the method of the present invention are performed or used by a mobile terminal 10, the method may be employed by other than a mobile terminal. Moreover, the system and method of the present invention will be primarily described in conjunction with mobile communications applications. It should be understood, however, that the system and method of the present invention can be utilized in conjunction with a variety of other applications, both in the mobile communications industries and outside of the mobile communications industries. In exemplary embodiments, the system and method of the present invention are applicable to autostereoscopic displays. However, it should be noted that the system and method of the present invention are also applicable to other stereoscopic displays which have one or more common elements in the display process to autostereoscopic displays. As used herein, the terms "stereoscopic" and "autosteroscopic" are used interchangeably. As such, stereoscopic displays encompasses autostereoscopic displays and other similar stereoscopic displays.

The mobile terminal 10 includes an antenna 12 in operable communication with a transmitter 14 and a receiver 16. The mobile terminal 10 further includes a controller 20 or other processing element (such as, for example, a CPU) that provides signals to and receives signals from the transmitter 14 and receiver 16, respectively. The signals include signaling information in accordance with the air interface standard of the applicable cellular system, and also user speech and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second and/or third-generation communication protocols or the like. For example, the mobile terminal 10 may be capable of operating in accordance with second-generation (2G) wireless communication protocols IS-136 (TDMA), GSM, and IS-95 (CDMA) or third-generation wireless communication protocol Wideband Code Division Multiple Access (WCDMA).

It is understood that the controller 20 includes circuitry required for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content, according to a Wireless Application Protocol (WAP), for example.

The mobile terminal 10 also comprises a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other keys used for operating the mobile terminal 10. Alternatively, the keypad 30 may include a conventional QWERTY keypad. The mobile terminal 10 further includes a battery 34, such as a vibrating battery pack, for powering various circuits that are required to operate the mobile terminal 10, as well as optionally providing mechanical vibration as a detectable output.

In an exemplary embodiment, the mobile terminal 10 may include a graphics processing unit (GPU) 36 in communication with the controller 20, or other processing element such as a CPU, for example. (In an alternative exemplary embodiment, the mobile terminal 10 may include GPU 71 in communication with the controller 20, or other processing element.) The GPU 36 may be any means, in hardware or software, capable of processing raw 2D or 3D content. For instance, the GPU 36 is capable of processing a number of primitives corresponding to video data of a scene or image data to produce all of the 2D or 3D data points corresponding to the scene or image so that the scene or image can be viewed on a display (e.g., display 28). In an exemplary embodiment, display 28 may be a stereoscopic display. Additionally, GPU 36 is capable of rendering 3D content corresponding to multiple viewpoints. The controller 20 may include functionality to execute one or more 3D applications which may be stored in memory. The 3D applications executed by the controller 20, include but are not limited to, applications such as 3D video conferencing, 3D user interface, games as well as 3D applications associated with maps, calendars, address books, advertisements, image viewers, message viewers, file browsers, web browsers, e-mail browsers and the like. The controller 20 is capable of sending vertices to GPU 36 (via bandwidth bus 18). The received vertices correspond to primitives that are associated with an area of an image or scene of a 3D application that requires rendering (i.e., producing the pixels of an image or scene based on primitives). In exemplary embodiments of the present invention, bandwidth bus 18 may be a Peripheral Component Interconnect (PCI) bus, an Advanced Graphics Processor (AGP) bus or the like. As used herein, the terms "content," "image data," "video data," "information" and similar terms may be used interchangeably to refer to data capable of being transmitted, received and/or stored in accordance with embodiments of the present invention. Thus, the use of such terms should not be taken to limit the spirit and scope of the present invention.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

An exemplary embodiment of the invention will now be described with reference to FIG. 8, in which certain elements of GPU 36 are displayed. The GPU 36 may be employed, for example, on the mobile terminal 10 of FIG. 7. However, it should be noted that the GPU 36 of FIG. 8, may also be employed on a variety of other devices, both mobile and fixed, and therefore, embodiments of the present invention should not be limited to application on devices such as the mobile terminal 10 of FIG. 7. For example, the GPU of FIG. 8 may be employed on a personal or desktop computer, etc. It should also be noted that while FIG. 8 illustrates one example of a configuration of the GPU, numerous other configurations may also be used to implement other embodiments of the present invention.

Referring now to FIG. 8, a unified GPU architecture for stereoscopic rendering having the capability to perform viewpoint-dependent computation based on multiple rendering viewpoints of a display is provided. The GPU 36 includes a vertex processing unit having input registers 44, output registers 46, and vertex shaders 68, 70 and 72. The GPU 36 also includes a primitive assembler 48, a primitive replication unit 50, a rasterizer 52, a pixel processing unit 54 and pixel buffers 62, 64 and 66. Each of the elements of the GPU 36 may be any means embodied in hardware, software, or a combination of hardware and software that is capable of processing 2D or 3D content. As shown in FIG. 8, the GPU 36 receives vertices (with attributes) corresponding to triangles in a triangle mesh (or other primitives) sent from controller 20 during a Vertex Fetch operation. The vertex shaders 68, 70 and 72 may receive the vertices in parallel. The vertex shaders 68, 70 and 72 can access viewpoint-dependent registers 44 containing information such as projection matrices for multiple viewpoints based on the received vertices. Similarly, the vertex shaders 68, 70 and 72 can access viewpoint-independent registers 44 containing information such as animation (skinning) matrices based on the received vertices by accessing input register 44. The vertex shaders can also calculate viewpoint-independent computations such as diffuse illumination and use the results of the computations for all the viewpoints supported by a display (e.g., display 28). Advantageously, the vertex shaders calculate the viewpoint-independent data only once for all of the viewpoints supported by the display or, if not once, a fewer number of times than the number of viewpoints supported by the display. In this regard, an effective leveraging of the coherence in vertex processing is achieved. Each of the vertex shaders 68, 70, and 72 can also individually compute viewpoint-dependent (i.e., specific) information such as vertex projection and specular illumination, for example. The computed viewpoint-independent and viewpoint-dependent information can be written to an output registers 46.

Subsequently, after all the vertices corresponding to a triangle (or other primitive) are processed by the vertex shaders, the vertices are then transmitted to a primitive assembler such as primitive assembler 48 which assembles the vertices together as a triangle (or other primitive). The triangle is then replicated by the primitive replication unit 50 into multiple triangles (or other primitives). To be precise, the triangle is replicated K times (i.e., once for each viewpoint) by the primitive replication unit 50. The primitive replication unit 50 also adds a unique tag to each or the triangles (or other primitives) which identifies the viewpoint that the respective triangle (primitive) is destined for. As described herein, the unique tag is referred to as a view tag. Each of the replicated triangles (or other replicated primitives) is then processed individually by the rasterizer 52 and converted to a pixel(s). The rasterizer 52 can add a view tag to the converted pixels so that the pixels identify a respective triangle (primitive) and identify a respective pixel buffer that the pixel is destined for. The converted pixels can then be processed by the pixel processing unit 54 and written to a pixel buffer (e.g. written to one of pixel buffers 62, 64 and 66) corresponding to a respective viewpoint. According to embodiments of the present invention, there are K different pixel buffers (i.e., one for each viewpoint). The pixels are subsequently output to a display 28 for displaying a corresponding scene or image.

Since GPU 36 is capable of ensuring that viewpoint independent information, corresponding to multiple viewpoints, is only computed once and given that memory fetch requirements for the different viewpoints are performed only once, GPU 36 serves to reduce computations, power consumption and bus bandwidth consumption of an electronic device such as mobile terminal 10, for example. In this regard, GPU 36 can be applied to future generations of GPUs including embodiments that include primitive processing units such as geometry shaders which process primitives assembled together by the triangle assembler 6.

Referring now to FIG. 9, a modified graphics rendering pipeline for providing stereoscopic rendering of existing GPUs is provided. Particularly, FIG. 9 illustrates a modified rendering pipeline that adds software and/or hardware components to a GPU (e.g., GPU 71) in order to enable stereoscopic rendering for a GPU that was originally designed for monoscopic graphics rendering applications. As such, the modified graphics rendering pipeline of FIG. 9 is capable of enabling a monoscopic graphics application to output stereoscopic images. The modified graphics rendering pipeline of FIG. 9 may be employed on the mobile terminal 10 of FIG. 7. Particularly, GPU 71 may be connected to and under of control of controller 20. However, it should be noted that the modified graphics pipeline of FIG. 9, may also be employed on a variety of other devices, both mobile and fixed, and therefore, embodiments of the present invention should not be limited to application on devices such as mobile terminal 10 of FIG. 7.

Initial configuration to enable rendering to multiple viewpoints is required. The configuration includes defining a projection matrix corresponding to each of the K views and setting up a separate pixel buffer for each viewpoint. Typically, rendering processing involves a CPU sending primitives of a scene directly to the GPU. For instance, a triangle mesh is typically rendered by sending the vertices of each triangle sequentially to the GPU. (See e.g., "Vertices" sent from CPU 2 directly to GPU 5 of FIG. 6). However, as shown in FIG. 9, the controller 20 may send vertices associated with primitives corresponding to a scene or image to a primitive replication unit such as triangle replication unit 74 before the vertices are processed by a GPU. The primitive replication unit 74 replicates each primitive K times (i.e., once for each viewpoint). For example, a vertex sequence v1 v2 v3 representing a triangle may be replicated by triangle replication unit 74 as v1 v2 v3 v1 v2 v3 . . . v1 v2 v3 while a vertex sequence v1 v2 v3 representing a set of points may be replicated as v1 v1 . . . v1 v2 v2 . . . v2 v3 v3 . . . v3 by triangle replication unit 74.

When a primitive is being replicated, the primitive replication unit 74 assigns the replicated primitive a unique identification tag (i.e., view tag) that identifies the viewpoint for which the primitive is destined. The vertices corresponding to each of the replicated primitives is processed by the vertex-processing unit 56 of the rendering pipeline (i.e., GPU 71). At this stage, view-dependent computations such as projection and lighting are advantageously performed in a viewpoint-dependent manner. In this regard, the view tag information can be used by vertex processing unit 56 to identify the viewpoint for which a vertex is destined and thus the vertex processing unit 56 can calculate the applicable view-dependent computations. The replicated vertices can then be assembled into a primitive (e.g., triangle) by a primitive assembler such as for example triangle assembler 58. The primitive (e.g., triangle) is subsequently rasterized into pixels by rasterizer 60. The rasterizer 60 utilizes the view tag information corresponding to each primitive and transfers each of the rasterized pixels along with the view tag information to pixel processing unit 82. During pixel processing, the pixel processing unit 82 ensures that the viewpoint-dependent computations such as shading and reflection mapping take the viewpoint into account. The pixel processing unit 82 may use the view tag of each of the rasterized pixels to identify the viewpoint for which a pixel is destined and calculate the appropriate viewpoint-dependent computations.

After a pixel is processed by the pixel processing unit it is directed to a respective pixel buffer (e.g. one of pixel buffers 76, 78 and 80) corresponding to the viewpoint for which it is destined. There are K pixel buffers (i.e., one for each viewpoint). After all the primitives are rendered, K images (i.e., one for each viewpoint) are processed and put together by the pixel buffers 76, 78 and 80 in a format that the stereoscopic display (e.g. display 28) expects (e.g., image interlacing).

The modified graphics pipeline of FIG. 9 enables a monoscopic graphics application operating on an existing generation of GPUs to output stereoscopic images. In this regard, the modified graphics pipeline of FIG. 9 helps reduce the cost associated with developing a device with stereoscopic display. And the modified graphics pipeline of FIG. 9 would also help applications written for monoscopic applications to be easily converted to stereoscopic devices.

Referring now to FIG. 10, pixel buffer replication for a stereo display having four viewpoints is illustrated. As referred to herein the term "pixel buffer replication" means that all buffers corresponding to pixel attributes such as color, depth, and stencil need to be replicated. According to exemplary embodiments of the present invention there are two ways to replicate a pixel buffer. As shown in the conventional GPU 5 of FIG. 6, existing GPUs typically do not have K pixel buffers (i.e., one for each viewpoint). Instead, they have a single pixel buffer, such as buffer 15, in which pixels corresponding to all of the primitives of a scene or image are written. In order to generate the modified graphics rendering pipeline of FIG. 9, K pixel buffers (e.g., pixel buffers 76, 78 and 80) typically need to be created from a single pixel buffer (e.g., buffer 15 of FIG. 6) of existing GPUs. According to exemplary embodiments of the present invention, there are two ways to replicate a pixel buffer, as shown alternately in FIG. 10.

The first approach is referred to herein as "pixel buffer sharing." Pixel buffer sharing may be achieved by partitioning an original pixel buffer 15 resolution into a 1D or a 2D grid of lower resolution pixel buffers. For instance, if original pixel buffer 15 has a resolution of 200×200, each of the four lower resolution pixel buffers shown in FIG. 10 will have a resolution of 100×100. Each of the lower resolution pixel buffers corresponds to a viewpoint of a display and is assigned to a unique viewpoint. To be precise, each of the four lower resolution pixel buffers shown in the exemplary embodiment of FIG. 10 corresponds to four viewpoints of a stereo display. At a first glance, pixel buffer sharing might seem as if it leads to a resolution reduction in rendering. However, this is generally not the case due to the physical properties of a display device. For instance, in stereoscopic systems such as the two-viewpoint Sharp parallactic display, when a graphics application opens a window of resolution 100×100, the display expects that each of the views use a 50×100 resolution pixel buffer. As such, the resolution reduction in this case is dictated by the display. The majority of autostereoscopic displays currently fall into this category.

Nevertheless, there are situations in which the pixel buffer sharing arrangement will lead to a resolution reduction such as, for example, in stereoscopic systems such as shutter glass systems. In such a situation, a second approach to replicate a pixel buffer may be used (which is herein referred to as pixel buffer expansion) instead of pixel buffer sharing. Regarding pixel buffer expansion, a different pixel buffer of a size larger than the one required by a window of a display is provided. For instance, if original pixel buffer 15 has a resolution of 200×200, pixel buffer expansion may result in a pixel buffer having a resolution of 400×400. The expanded pixel buffer may have a grid of higher resolution pixel buffers. For instance, each of the higher resolution pixel buffers may have a resolution of 200×200 and each pixel buffer is assigned to a unique viewpoint (i.e., four viewpoints corresponding to a four viewpoint stereo display in FIG. 10). It should be understood that pixel buffer expansion typically requires an increase in memory space. In order to achieve pixel buffer expansion, a render-to-texture capability of current graphics cards may be utilized to allocate such a pixel buffer. The render-to-texture capability of current graphics cards may be utilized to allocate such a pixel buffer. The render-to-texture capability feature allows a graphics application to direct the pixels to a texture as opposed to a framebuffer. (Traditional graphics has rendered to a fixed buffer called a framebuffer which is later used to display on the screen. The render-to-texture capability allows an application to direct the target of the rendering to an internal memory location that may or may not be incorporated directly in the final display.) In this case, the render-to-texture capability can be used to request a larger resolution pixel buffer than the framebuffer of the application.

Ideally, one would prefer that each viewpoint-specific (i.e., dependent) pixel buffer has the same resolution as an original pixel buffer. However, this may not be possible in some cases as there are practical limits to the size of the largest texture that can be used in a render-to-texture scheme. In such a situation, the pixel buffer may be expanded to the largest size possible and post-rendering image scaling may be utilized to bring the size of the viewpoint-specific (i.e., dependent) pixel buffer to that expected by the corresponding display device.

It should be pointed out that both of the above approaches to pixel buffer replication require a modification at the vertex processing stage by vertex processing unit 56 to ensure that vertex projections are offset to the correct pixel buffer. The modification is a simple 2D translation and can be directly incorporated into the projection matrix. Alternately, to the two approaches discussed above, approaches such as a Multiple Render Target (MRT), which allows multiple destination buffers for rendering can also be used to assign different buffers to each viewpoint, as known to those skilled in the art.

Consideration will now be given to three mechanisms in which to implement the modified graphics rendering pipeline of FIG. 9. It should be pointed out that the two approaches to pixel buffer replication, namely pixel buffer sharing and pixel buffer expansion, are independent of the three mechanisms that are capable of implementing the modified graphics rendering pipeline of FIG. 9. As such, either the pixel buffer sharing or the pixel buffer expansion approaches to pixel buffer replication may be utilized for any one of the three mechanisms. The first mechanism provides a framework which enables a software developer to modify software code that is originally written for monoscopic rendering in order to generate stereoscopic images. As discussed above, primitives corresponding to an image or scene are replicated by the modified graphics rendering pipeline of FIG. 9. As such, a software developer typically needs to modify a monoscopic software code to replicate primitives.

A software developer has several options for replicating a primitive. The simplest way is to directly replicate the primitive in memory (e.g., system memory or video memory). Alternately, the developer may issue multiple primitive rendering commands for each primitive of an image or scene. Another way to replicate primitives is to use batch-processing features of a corresponding graphics framework.

Referring to FIGS. 11 & 12, a system and method which provides a framework that enables a software developer to modify software code that is originally written for monoscopic rendering in order to generate stereoscopic images according to the modified graphics rendering pipeline of FIG. 9 are provided. As shown in FIG. 11, the primitive replication unit 74 of FIG. 9 is replaced by an OpenGL module 81. The OpenGL module 81 may be any device or means embodied in software that is capable of accepting primitives and using commands, such as call functions, to issue primitives to a graphics rendering pipeline. The OpenGL module may be embodied in software instructions stored in a memory of the mobile terminal 10 and executed by the controller 20. The controller 20 may pre-store certain information (such as the vertex array) in the graphics memory 84 which may be later retrieved by the GPU 71 (for example, during certain function calls to the OpenGL module such as, for example, glDrawArrays function call). It should also be noted that while FIG. 11 illustrates one example of a configuration of the Open GL module, numerous other configurations may also be used to implement embodiments of the present invention.

The OpenGL module 81 operates under the OpenGL graphics framework and it contains a call functions library 83. The call functions library 83 may be used by the Open GL module 81 to issue primitives to GPU 71. In this regard, the OpenGL module 81 is capable of issuing commands so that a program can replicate primitives. For illustrative purposes, the discussion below regarding replicating primitives will be explained in terms of triangle replication using a glDrawArrays call function of the OpenGL graphics framework. It should be pointed out, however, that a similar approach can be employed for replicating other primitives such as points and polygons, for example. As shown in FIG. 11, the vertices corresponding to primitives, such as triangles, are received by the OpenGL module 81. Subsequently, the OpenGL module 81 calls function glDrawArrays from the call functions library 83 so that the vertices can be replicated. The glDrawArrays function call allows a program to render multiple rendering primitives with a single function call. As known to those skilled in the art, the glDrawArrays function has three parameters: 1) an enumerated type parameter that identifies the rendering primitive; 2) a parameter indicating an index into the array of vertex attributes; and 3) a parameter specifying the number of primitives to render (the number of primitives to render are based on the index associated with the second parameter).

Triangle replication using a glDrawArrays call function is mainly useful when the corresponding monoscopic application that needs to be made stereoscopic is not rendering from a vertex array. Initially, during the initialization time of the application, the graphics memory is allocated to in order to store K dummy triangles in the graphics memory. (See block S1) Subsequently, identifications (IDs) of each vertex of the dummy triangles are stored in graphics memory as wells as dummy triangles. (See blocks S2 and S3) Thereafter, each triangle is rendered by packing the vertex position of each of the three vertices of a respective triangle into unused attribute slots of the vertex instead of the regular vertex position slot. (See block S4) All attribute slots are acceptable for this purpose except a vertex position attribute slot. (for example, the vertex position slot in OpenGL is filled with a glVertex( ) command) The reason that the vertex position attribute slot is unacceptable is because the vertex position attribute is rewritten after sending each vertex to the GPU 71. On the other hand, the other attribute slots are acceptable since they are not rewritten after each vertex is sent to the GPU 71.

By using the glDrawArrays function call of the OpenGL module 81, (See block S5) as opposed to using three glVertex function calls to render one triangle, multiple triangles are rendered having parameters of GL_TRIANGLES (i.e., the first parameter), the index of the first dummy triangle (i.e., the second parameter), and K (i.e., the third parameter). For instance, the first parameter specifies that the dummy primitives are triangles. Alternately, the first parameter can be a triangle strip if the software developer so chooses. (A triangle strip is a set of adjoining triangles that is constructed from a given triangle mesh. They can be rendered by calling glDrawArrays with GL_TRIANGLE_STRIP as the first parameter.) The second parameter specifies the index of the first dummy triangle and the third parameter specifies that K (i.e., one for each viewpoint) dummy triangles need to be rendered.

Each incoming vertex of the array needs to be assigned to act as an original vertex being rendered to a particular viewpoint prior to the replicated vertices arriving at the vertex shader 86 of pixel processing unit 56. In other words, each incoming vertex, transmitted from the OpenGL module 81 to the GPU 71, of the array needs to be assigned a unique (triangle vertex, viewpoint) combination. To achieve this purpose, the software developer enumerates the array vertices of the dummy triangles in the range of 0, 1, . . . , 3K−1, and stores their respective identification (ID) as the x-coordinate of their vertex position. The identifications may be stored in graphics memory 84. When the controller 20 makes a glDrawArray call, these vertices are transferred from the memory 84 to the vertex processing unit 56 by the OpenGL module 81. (See block S6) When a vertex (that was stored in the graphics memory) with an ID of d from the array arrives at the vertex shader 86 of the vertex processing unit 56, it is assigned to act as vertex (d mod 3) of the triangle and it is assigned a view tag number of $$\left\lfloor \frac{d}{K} \right\rfloor.$$

(See blocks S3 and S7)

The view tag of a vertex can be used for viewpoint-dependent operations at the vertex shader 86. (See block S8) Such operations include viewpoint-dependent projection. The projection operation requires the software developer to load a separate projection matrix for each viewpoint as a global variable in the vertex shader 86 (this can be done at the beginning of frame rendering). The vertex shader 86 can then multiply the vertex position and multiply it with the projection matrix corresponding to the viewpoint $$\left\lfloor \frac{d}{K} \right\rfloor.$$

(See block S9) A similar approach can be used for other viewpoint-dependent operations such as specular illumination. Typically, the vertex shader 86 can handle the viewpoint-dependent and viewpoint-independent operations and can setup the input for the pixel shader 88 of the pixel processing unit 82 so that it is able to perform both viewpoint-dependent and viewpoint-independent operations. This setup is done implicitly via the primitive assembler 58 and the rasterizer 60.

After each of the replicated vertices are utilized by the vertex shader 86 for viewpoint-dependent operations they are transferred to a primitive assembler such as triangle assembler 58 and assembled into a triangle. The triangle is then rasterized into pixels by rasterizer 60. (See block S10) Each of the rasterized pixels specify their respective view tags in the manner discussed above with respect to FIG. 9. The rasterized pixels are sent (along with their respective view tags) to the pixel shader 88 of the pixel processing unit 82. The pixel shader 88 utilizes the viewpoint-dependent information setup by the vertex shader 86 and the view tags (which corresponds to a viewpoint) associated with the rasterized pixels in order to perform viewpoint-dependent operations such as specular shading and reflection mapping. The pixel shader 88 also does viewpoint-independent operations such as diffuse shading. (See block S11) Each of the pixels is then output by the pixel processing unit 82 to the corresponding partition of the pixel buffer which is partitioned according to the pixel buffer sharing or the pixel buffer expansion approaches discussed above. (See block S12) Each of the respective pixels can then be output to a partition of the replicated pixel buffer corresponding to its viewpoint. (See e.g., FIG. 10) Thereafter, K images are then put together and output in a format that can be utilized by a stereoscopic display (e.g., display 28). (See block S13)

If the software developer is using an expanded pixel buffer or a shared pixel buffer to perform pixel buffer replication, (See e.g., FIG. 10) then the developer needs to ensure that the vertices are projected to the correct part of a respective pixel buffer (e.g., one of the four partitions in the pixel buffer expansion scheme of FIG. 10). Ensuring that the pixels are projected to the correct part of a respective pixel buffer requires screen-space translation depending on the viewpoint in question. The developer can directly incorporate this into the projection matrix corresponding to that viewpoint or induce a separate 2D translation after the projection.

As discussed above, the vertex shader 86 can typically handle most of the viewpoint-dependent operations and can setup the input for the pixel shader 88 so that it does minimal processing. However, in some instances, software developers may find it advantageous to have the viewpoint information at the pixel shader for operations such as per-pixel shading. In such situations, the developer can pre-load such viewpoint-dependent information in the global registers 90 of the pixel shader 88 and transfer the view-tag of the replicated triangle to the pixels of the triangle using a texture coordinate slot. The pixel can then be processed in a viewpoint-dependent fashion by using the view-tag to access the correct viewpoint-dependent information.

It should be understood that the above method of primitive replication can also be implemented using other similar OpenGL functions such as, for example, the glDrawElements function call. Additionally, equivalent implementations exist in many other graphics rendering frameworks, such as Microsoft DirectX, which may be utilized to perform primitive (e.g. triangle) replication in a similar manner to that discussed about with respect to the OpenGL graphics framework.

The method described above for modifying a monoscopic code such that it outputs stereoscopic images may not always be a viable option. For instance, this may be especially true for graphics processing units that have already been produced and deployed as well as for resource constrained low end developers. As such, a method for modifying a graphics driver such that it will enable monoscopic applications to output stereoscopic images may be extremely beneficial.

Refer to FIGS. 13 and 14 for a system and method for modifying a graphics driver so that it can accept commands from graphics applications designed for monoscopic rendering and process these commands in such a way that stereoscopic images are rendered and provided. In this regard, the system of FIG. 13 provides a second mechanism for implementing the modified graphics rendering pipeline of FIG. 9. The system of FIG. 13 helps to ensure that a monoscopic application automatically generates stereoscopic images without any modification to the graphics application. The system of FIG. 13 may be employed, for example, on the mobile terminal 10 of FIG. 7. However, it should be understood that the system of FIG. 13, may also be employed on a variety of other devices, both mobile and fixed, and therefore, other embodiments of the present invention should not be limited to application on devices such as the mobile terminal of FIG. 7. The modification framework discussed herein is described in terms of the OpenGL graphics driver/module. However, it should be understood that the modification framework of present invention should not be limited in this respect. For instance, similar modifications can be made to other graphics drivers such as the Microsoft DirectX graphics driver/module without departing from the spirit and scope of the present invention.

In this exemplary embodiment, the modified OpenGL module 92 is a graphics driver which may be any device or means embodied in hardware or software or a combination thereof capable of interpreting traditional graphics commands from the perspective of stereoscopic rendering. In this regard, the modified OpenGL module 92 typically has both means and data for configuring a previously existing GPU such that the GPU (e.g. GPU 71) can output stereoscopic images to display 28. In this exemplary embodiment, the modified OpenGL module 92 may be embodied in software instructions which may be executed by a processor or controller 20. The controller 20 may pre-store certain information (such as the vertex array) in the graphics memory 84 which may be later retrieved by the GPU 71 (for example, during certain function calls to the modified OpenGL module 92, such as, for example, glDrawArrays). Additionally, GPU 71 may be any device or means embodied in hardware or software capable of rendering a 3D object such that it may be viewed on a stereoscopic display (e.g., display 28). In this regard, the vertex processing unit 56 contains a vertex shader 86 having a vertex shader program. The vertex shader program may include software instructions in computer readable code which are capable of processing attributes of primitives (such as, for example, vertices of a triangle). In like manner, the pixel processing unit 82 includes a pixel shader 88 having a pixel shader program. The pixel shader program may contain software instructions in computer readable code that are capable of shading pixels. As shown in FIG. 13, vertices corresponding to primitives are transferred by controller 20 to OpenGL module 81. (See block S1) OpenGL module 81 may retrieve a call function (command) so that the received vertices can be processed by modified OpenGL module 92. (See block S2) The modified OpenGL module 92 is capable of receiving a call function(s), which may be designed for monoscopic applications, from OpenGL module 81. The modified OpenGL module 92 may contain software instructions which interpret the call function designed for monoscopic applications and process it in a way such that GPU 71 is capable of generating stereoscopic images. The modified OpenGL module 92 includes a low-level kernel device driver 95 which communicates with the GPU in a low-level command language understood by the GPU.

As noted above regarding the discussion of FIGS. 9 and 10, the modified graphics pipeline of FIG. 9 requires that pixel buffer replication is performed on an original pixel buffer. As such, the first issue that the modified OpenGL module 92 typically addresses concerns the replication of a pixel buffer (e.g. replication of original pixel buffer 15). In order to achieve pixel buffer replication modified OpenGL module 92 must identify the size of an original pixel buffer (e.g., original pixel buffer 15). The modified OpenGL module 92 can identify the size of the original pixel buffer from a glViewport call function received from the call functions library 83 of the OpenGL module 81. The modified OpenGL module 92 typically needs to choose between the pixel buffer expansion and the pixel buffer sharing approaches of pixel buffer replication, as discussed above. (See block S3) The choice between pixel buffer expansion and pixel buffer replication can be made, by modified OpenGL module 92, statically during a driver installation time by querying display properties.

As noted above with respect to the discussion of the modified graphics pipeline of FIG. 9, primitive replication is typically required. In order to replicate primitives at the modified OpenGL module 92, it must be recognized that graphics rendering frameworks typically allows the corresponding graphics application to transfer the geometry, corresponding to a scene or image, as single primitives (e.g., vertices of a triangle) or as a pointer to an array of primitives. For instance, controller 20 may send primitives such as vertices corresponding to a scene or image generated by a graphics application under control of controller 20. The sent vertices may be received by the OpenGL module 81. In the OpenGL graphics framework, primitives may be transferred down a graphics pipeline as single primitives using the glVertex3f call function or the vertices may be transferred as a pointer to an array of primitives using a glDrawArrays call function. A primitive replication method for both the glVertex3f call function and the glDrawArrays call function is provided herein. If the graphics application is sending the geometry as individual primitives the OpenGL module 81 issues the glVertex3f call function to the modified OpenGL module 92. The modified OpenGL module 92 processes the glVertex3f call function in a typical manner as understood by those skilled in the art. This mainly involves setting up the state of the GPU and transferring the vertex information to the GPU. In addition, the modified OpenGL module 92 tracks a vertex attribute of previously received primitive (e.g., a vertex corresponding to a triangle) and replicates the previously received primitive when the last glVertex call function is made for a corresponding primitive. For example, if an object (i.e., image or scene) is being rendered as a set of triangles, then the modified OpenGL module 92 tracks the vertex attributes of the current vertex and the last two vertices that the graphics application has sent to the OpenGL module 81. The modified OpenGL module 92 also processes the received glVertex call functions in the usual manner, as understood to those skilled in the art. When the OpenGL module 81 issues the glVertex call function for the last vertex of a triangle, the modified OpenGL module 92 processes the call function as usual (i.e., in a manner understood by those skilled in the art) and performs additional processing as if it received the last three vertex K−1 additional times. For example, if a display supports five viewpoints (i.e., K=5), modified OpenGL module 92 will replicate the last three received vertex four additional times (i.e., 5−1=4). In this regard, the modified OpenGL module 92 is able to replicate the vertex according to the number of viewpoints supported by a corresponding display. (See block S4)

Similarly, when the OpenGL module 81 issues a glDrawArrays call function, multiple primitives (e.g., vertices of a triangle) may be transferred to the modified OpenGL module 92 as an array. For example, if the image or scene generated by a graphics application is being rendered as a triangle and the OpenGL module 81 issues a glDrawArrays call function, the modified OpenGL module 92 may process multiple vertices in the form of an array based on the glDrawArrays call function. In this regard, multiple triangles may be rendered. To be precise, the modified OpenGL module 92 processes the glDrawArrays call function and will perform additional processing corresponding to K−1 additional call functions of glDrawArrays. For instance, if a corresponding display supports four viewpoints, the modified OpenGL module 92 performs processing three additional times (i.e., 4−1=3) to replicate vertices corresponding to four triangles. (See block S4) Utilizing the glDrawArrays call function in the manner discussed above to achieve primitive replication, nominally deviates from the approach described above with respect to FIG. 9. The reason for this is because a series of triangles of the form t1 t2 . . . tN will be replicated as t1 t2 . . . tN, t1 t2 . . . tN, t1 t2 . . . tN instead of t1t1 . . . t1, t2 t2 . . . t2, tN tN . . . tN. However, this difference should only (nominally) affect the efficiency of the processing by the modified OpenGL module 92 as opposed to its correctness since in the first case the switching between the viewpoints is more often.

In order to effectuate vertex processing in the modified graphics rendering pipeline, modified OpenGL module 92 typically needs to address two issues. First, the modified OpenGL module 92 needs to assign a view-tag to the vertices of the primitives. Second, the modified OpenGL module 92 needs to modify a vertex shader program. In order to assign a view-tag to the replicated vertices, an unused vertex attribute slot is employed. The unused vertex attribute slot could be, for example, a separate 1D texture coordinate or even the fourth component of the vertex position values. For example, the driver could pass the viewtag as texture coordinate (e.g., TEXCOORD4) or as the w component of the texture coordinate (e.g., TEXCOORD4.w). The modified OpenGL module 92 assigns each replicated primitive a unique view-tag in the range 0, 1, . . . , K−1 (where K corresponds to the number of viewpoints supported by a corresponding display). The modified OpenGL module 92 also assigns the view-tag assigned to a corresponding primitive to all the vertices of that primitive. (See block S5) For example, if a primitive is assigned view tag 1, then vertices corresponding to the primitive will also be assigned view tag 1. If the primitives are being rendered as individual primitives according to the glVertex call function, the modified OpenGL module 92 passes the view-tag of the respective primitive (to the vertex processing unit 56) as a separate texture coordinate. The modified OpenGL module 92 passes the view-tag of the respective primitive once per primitive. On the other hand, if the primitives are being rendered using arrays of vertex attributes, then the modified OpenGL module 92 only needs to send a view-tag (to the vertex processing unit 56) once for every replicated glDrawArrays call function. This is because the OpenGL graphics framework (like many other graphics frameworks) is a state machine and hence, the value of the texture coordinate is not reset from one vertex to the next, unless it is changed explicitly.

Once the modified OpenGL module 92 replicates primitives either by using either the glVertex or the glDrawArrays call functions discussed above and assigns a view tag to each of the vertices of the primitives, the replicated vertices may be transferred to the GPU 71. To be precise, the replicated vertices are transferred to the vertex processing unit 56 so that the vertex shading program of the vertex shader 86 may process attributes of the vertices. As noted above, the modified OpenGL module 92 typically must modify the original vertex shading program so that stereoscopic images can be viewed on display 28. One modification of the vertex shader program is to ensure that the replicated vertices are transformed by a projection matrix corresponding to their respective viewpoint. This modification ensures spatial parallax effect for stereoscopic rendering and also ensures that the primitives are rendered to the correct pixel buffer (i.e., the correct partition of a replicated pixel buffer). It should be pointed out that the modified vertex shader program described herein is capable of performing more complex viewpoint-dependent computations such as specular illumination, for example. However, such complex computations may be difficult to detect by a device driver. As such, in an alternative exemplary embodiment, modified OpenGL module 92 ensures that the basic task of providing correct vertex projection corresponding to the replicated vertices is achieved without considering the correctness of the illumination for each viewpoint.

The modified OpenGL module 92 may modify the vertex shader program which may be embodied at vertex shader 56. (See block S6) The vertex shader program is typically written in a shading language such as, for example, OpenGL Shading Language (GLSL). The modified OpenGL module 92 may also modify vertex shader programs written in other suitable shading languages. Modification of the vertex shader program typically requires the modified OpenGL module 92 to either modify a GLSL compiler (not shown) or to use an external GLSL parser 99 to add additional lines of code to the existing (i.e., original) vertex shader program. The modified OpenGL module 92 typically may modify the vertex shading program by determining the view-tag of a respective vertex, by retrieving the projection matrix corresponding to the viewpoint of a vertex, and by replacing instances of the original projection matrix with the viewpoint-dependent projection matrix. An example of an exemplary vertex shader program modified by modified OpenGL module 92 is provided below.

```
varying vec3 ecNormal; //vertex normal output for pixel shader
varying vec3 ecPosition; //vertex position output for pixel shader
uniform vec3 LightPosition; // Input position of the light position
void main(void) {
// Transform the vertex by the model-view matrix
ecPosition = vec3 (gl_ModelViewMatrix * gl_Vertex);
// Transform the normal
ecNormal = normalize(gl_NormalMatrix * gl_Normal);
// Transform the vertex position
gl_Position = gl_ProjectionMatrix * gl_ModelViewMatrix * gl_Vertex;
}
```

The above vertex shader program defers the lighting computations to pixel shader 88 and performs the necessary pre computations for the pixel shader 88 at the vertex shader 86. The inputs to the vertex shader 86 are the vertex position (gl_Vertex), the vertex normal (gl_Normal), the modelview matrix (gl_ModelViewMatrix), the normal matrix (gl_NormalMatrix), and the projection matrix (gl_ProjectionMatrix). The vertex shader program outputs the position (ecPosition) and the normal (ecNormal) of each vertex with respect to each human eye. (See block S7) The output of the vertex shader is carried along further to the primitive assembler. The vertex shader program also outputs the translated and projected value (gl_Position) of the vertex position. The primitive assembler 58 utilizes the outputted position (ecPosition) and the normal (ecNormal) of each replicated vertex and assembles the replicated vertices into primitives such as triangles and the rasterizer 60 rasterizes the triangles into pixels. The outputted position (ecPosition) and the normal (ecNormal) of each vertex are subsequently interpolated across a display screen (e.g., display 28) by rasterizer 60 to derive a per-pixel position and normal information at the pixel shader 88. (See block S8) The pixel shader 88 uses the pixel shader program to perform pixel shading processes (e.g., lighting computations) on each of the rasterized pixels based on viewpoint-dependent information associated with the rasterized pixels. (See block S9) The rasterized pixels are then output to a replicated pixel buffer of original pixel buffer 15 according to either the pixel buffer sharing or pixel buffer expansion approaches discussed above. (See block S10) Subsequently, K images are grouped together and sent to a stereoscopic display such as display 28. (See block S11) (The triangle assembler 58, the rasterizer 60 and the pixel processing unit 82 utilizes the outputs of the vertex shading program to assemble primitives, rasterize the pixels and perform pixel processing in a manner known to those skilled in the art.)

An example of the above vertex shader program modified for viewpoint dependent projection is provided below.

```
varying vec3 ecNormal; //vertex normal output for pixel shader
varying vec3 ecPosition; //vertex position output for pixel shader
uniform vec3 LightPosition; // Input position of the light position
uniform mat4 viewpointDependentProjectionMatrix[6]; //a projection matrix for each of the 6 viewpoints
uniform sampler1D tex; // Dummy texture
void main(void) {
// get the view-tag information from the forth texture coordinate value
int viewTag;
viewTag = gl_TexCoord[0].s;
// set the new projection matrix
mat4 newProjectionMatrix;
newProjectionMatrix = viewpointDependentProjectionMatrix[viewTag];
// Transform the vertex by the model-view matrix
```

-continued

```
ecPosition = vec3 (gl_ModelViewMatrix * gl_Vertex);
// Transform the normal
ecNormal = normalize(gl_NormalMatrix * gl_Normal);
// Transform the vertex position
gl_Position = newProjectionMatrix * gl_ModelViewMatrix * gl_Vertex;
}
```

The modified vertex shader program code above is different from the original vertex shader program code in at least three ways. First, the modified OpenGL module 92 adds a uniform variable (viewpointDependentProjectionMatrix) to the original vertex program code which holds a projection matrix for each of the viewpoints. Second, the modified OpenGL module 92 adds a uniform texture variable (tex) to the original vertex shader program which allows the vertex shader 86 to reterive the view-tag as a texture coordinate (gl_TexCoord[0].s). Third, the modified OpenGL module 92 fetchs the appropriate viewpoint-dependent projection matrix and replaces every instance of the old projection matrix with the new projection matrix. Effectively, the three tasks above consist of adding some predetermined code components at the beginning of the code as well as a string replacement code, which can be easily performed by a language parser such as GLSL parser 94 without having to modify a compiler source. It should be pointed out that the modified vertex shader program code discussed above can produce slightly incorrect illumination because the variables ecPosition and ecNormal use viewpoint-independent matrices and hence both human eyes will see the specular highlight at the same point on the surface of the display (e.g., display 28). However, this slightly incorrect illumination will not hinder the stereoscopic effect significantly and the illumination disparity can only be detected by a trained observer. If it is possible for a software developer to modify the original vertex shading program, he/she could correct this illumination disparity by using viewpoint-dependent matrices or by having viewpoint-dependent parameters accessible at a vertex shader (e.g., vertex shader 86).

In an alternative exemplary embodiment, the GPU 71 may render to a texture using the render-to-texture capability instead of directly rendering to a framebuffer (e.g., original pixel buffer 15). This can be done for example to compute the reflection of the object in the mirror. When the GPU 71 renders to a texture instead of a framebuffer, the stereoscopic rendering approach described above and performed by the modified OpenGL module 92 is slightly modified. Oftentimes rendering to a texture is used for off-screen computations such as shadow computation rather than rendering for human eyes, as known to those skilled in the art. Given that rendering to a texture is often used for off-screen computations, it might not be advantageous to render scenes corresponding to the rendered texture from multiple viewpoints. In this regard, the modified OpenGL module 92 may enable stereoscopic rendering only when a target buffer for rendering serves as the framebuffer (e.g., original pixel buffer 15).

As known to those skilled in the art, sometimes graphics applications can render directly to a framebuffer and can read back the contents using the expensive glReadPixels call function of the Open GL graphics framework. Rendering directly to the framebuffer and reading back the contents using the glReadPixels call function can be problematic since the device driver has rendered to multiple viewpoints while the graphics application is expecting to read back the image as seen from a single viewpoint. The device driver may resolve this problem by sending the graphics application the rendering from one of the viewpoints (e.g., the viewpoint closest to the middle of the display may be chosen) of a multiple viewpoint display, as expected by the graphics application. It should be noted that the situation above in which the modified OpenGL module 92 only enables stereoscopic rendering when the framebuffer serves as one target buffer for rendering can in the worst case scenario produce a monoscopic rendering. Similarly, the situation above wherein the device driver only sends one viewpoint to the graphics application when the glReadPixels call function is utilized can in the worst case scenario produce a monoscopic rendering. For instance, a monoscopic rendering may arise when the graphics application renders to a texture and then directly copies the texture content to a framebuffer.

The method described above for modifying a graphics driver so that it can accept commands from graphics applications designed for monoscopic rendering and process these commands in such a way that stereoscopic images are rendered requires companies that make the graphics driver to modify their driver and release a new driver for the stereoscopic system. This solution while practical may nevertheless be difficult to implement from a platform and cost perspective. As such, a third mechanism to implement the modified graphics rendering pipeline of FIG. 9 may be beneficial.

Referring to FIGS. 15 and 16, a system and method which intercepts (i.e., traps) graphics rendering framework function calls and modifies them so that the graphics application effectively transmits the correct OpenGL calls for stereoscopic rendering are provided. It should be pointed out that the system and method of FIGS. 15 and 16 do not require modifications to either a monoscopic application software code or a graphics driver. In this exemplary embodiment, the graphics rendering framework corresponds to the OpenGL graphics rendering framework. However, it should be understood that any graphics rendering framework that follows a stream processing model may be employed without deviating from the spirit and scope of the present invention. (See e.g., FIG. 19 in which an OpenGL stream processing model is shown) The system of FIG. 15 may be employed, for example, on the mobile terminal 10 of FIG. 7. However, it should be understood that the system of FIG. 15, may also be employed on a variety of other devices, both mobile and fixed, and therefore, other embodiments of the present invention should not be limited to application on devices such as the mobile terminal of FIG. 7. The controller 20 may pre-store certain information (such as the vertex array) in the graphics memory 84 which may be later retrieved by the GPU 71 (for example, during certain function calls to the OpenGL module such as, for example, glDrawArrays).

The system of FIG. 15 employs an entity 94 which may be any device or means embodied in hardware, software or a combination of hardware and software that is capable of intercepting (trapping) graphics rendering framework call functions, for example, OpenGL call functions and modifying the call functions so that a graphics rendering application effectively sends OpenGL calls for stereoscopic rendering. Referring to FIG. 17, a block diagram of entity 94 is shown. As shown in FIG. 17, entity 94 (also referred to herein as interceptor entity) is capable of operating as a call functions trapper and can generally include a processor 96, controller or the like connected to a memory 97. The processor can also be connected to at least one interface 95 or other means for transmitting and/or receiving data, content or the like. The memory can comprise volatile and/or non-volatile memory, and typically stores content such as a modified call functions library or the like (e.g. Table 1 below). For example, the memory 97 typically stores software applications, instructions or the like for the processor to perform steps associated with operation of the entity in accordance with embodiments of the present invention. In this regard, the memory may contain software instructions for intercepting (trapping) call functions so that the processor 96 can process the instructions such that a graphics application sends the correct call functions, corresponding to stereoscopic rendering, to a GPU (e.g., GPU 71). Also, for example, the memory typically stores content transmitted from, or received by, the OpenGL module 81 (via interface 95). For instance, the memory may receive and store call functions sent from a dynamically linked library (dll) such as the call functions library 83 of OpenGL module 81.

Referring now to FIG. 18, an OpenGL stream processing model is provided. As understood to those skilled in the art, most graphics rendering frameworks use a stream processing model. To be precise, OpenGL typically retrieves input data as a stream of commands with parameters (See e.g., GL Command & parameters in FIG. 18). Some of these commands set the state of the OpenGL (e.g., OpenGL module 81). For example, the glMaterial command sets the reflective property of the surface that is about to be rendered. A large portion of all OpenGL commands are the geometry calls such as glVertex3f which input geometry data to a GPU (e.g., GPU 71) for rendering. The system of FIG. 15 presents a method of manipulating an OpenGL command stream (See e.g., FIG. 18) so that a monoscopic graphics application can effectively be converted into a stereoscopic graphics application. In this exemplary embodiment, the input data stream of commands is retrieved from a call functions library 83 of the OpenGL module 94. A graphics application may send vertices corresponding to primitives in the form of a call to the OpenGL module 81 so that the OpenGL module 81 can issue geometry commands to the GPU 71 for rendering. In this exemplary embodiment, when the graphics application issues a call to the OpenGL module 81 this call function is intercepted or trapped by entity 94 and it sends a possibly modified set of commands to the OpenGL module 81. (See block S1) The OpenGL module 81 works as usual by issuing the appropriate set of commands to the GPU The processor 96 of entity 94 analyzes the call function to determine if it is of interest from the perspective of making the graphics application stereoscopic. (See block S2) If so, the processor 96 of entity 94 retrieves a modified call function (corresponding to the received call function) from a modified call functions library stored in memory 97 and sends (i.e., passes) the modified call function to the OpenGL module 81. (See block S3). The protocol of communication between the OpenGL module 81 and the GPU 71 remains same as before. Not all the commands that are made to the OpenGL module need to be modified by the interceptor 94 (e.g., glMaterial( ) function of OpenGL). The interceptor entity 94 passes such commands unchanged to the OpenGL module 81 which processes the call. (See blocks S5 and S6) However some of the commands such as glVertex( ) need to be modified. The interceptor entity 94 replaces this command with the appropriate commands according to the call functions library 83 (See block S4) and sends these commands to the OpenGL module 81 which processes the call. (See blocks S5 and S6) The OpenGL module 81 interprets these commands as if it were dealing with a monoscopic application. (It should be pointed out that operation S5 in FIG. 16 serves to perform a similar role as that of modified OpenGL module 92 discussed above in that modified OpenGL module 92 directly modifies call functions received from the controller 20. The major difference is that instead of modifying the modified OpenGL module 92, the modified call functions approach of entity 94 allows a modification of call functions sent from the controller 20 without regards to the OpenGL module 81.) The OpenGL commands which require modification by entity 94 are the commands involving primitive (e.g., triangle) replication, vertex processing, pixel processing and pixel buffer replication.

As such, the relevant OpenGL commands that are intercepted (i.e., trapped) and processed by entity 94 are provided below in Table 1.

TABLE 1

| Incoming GL command | Action |
| --- | --- |
| First call to OpenGL | Check if the display/window assumes a pixel buffer sharing<br>Compute default viewpoint-dependent projection matrices<br>Enable stereo rendering |
| glViewport( x, y, width, height) | If the display/window assumes a pixel buffer sharing then use this option and send the command as is.<br>Else set an expanded frame buffer if possible and send glViewport( ) with the modified parameters.<br>Else set the rendering target to an expanded texture (if possible) and set the display mode to render-to-texture. Send glViewport( ) with the modified parameters.<br>Else choose the pixel buffer sharing arrangement (the output image will be in lower resolution). Send the command as is. |
| glShaderSource( shader, count, string, length) | If the shader source is for a vertex shader then modify the shader source program and send the new program as the vertex program<br>Save and compile the shader code for later use (when application is trying to render to a texture) |
| glUseProgramObjectARB( ) | Pass the viewpoint-dependent projection matrices to the shader as a uniform parameter |
| glMatrixMode( ),glLoadMatrix( ), glLoadIdentity( ), glScale( ), glRotate( ), glTranslate( ), . . . (all functions that affect the state of a projection matrix) | If the changes being made are to the projection matrix then compute the new projection matrix for each of the viewpoints depending on the state of the current projection matrix<br>If shader program is active then pass the viewpoint-dependent projection matrices to the shader as a uniform parameter |
| glBegin( mode) | Save the mode information which describes if the primitive is a point/line/triangle/etc. This information will be used later for primitive replication.<br>Set view-tag to 0 |
| glColor( ), glNormal( ), glTexCoord( ), . . . (all GL commands that specify a vertex attribute) | Store the command in a first-in, first-out (FIFO) list. The length of the list is dependent on the primitive being rendered and the number of attributes per vertex (including the extra 1D texture attribute for view-tag). Pass the commands to an OpenGL driver (OpenGL module 81). |
| glVertex3f( x, y, z) | Send glMultiTexCoord( GL_TEXTUREi, view-tag) to the driver and also insert it into the FIFO list (The 'i' in GL_TEXTUREi depends on which texture slot was found to be unused)<br>Pass the command to the driver (e.g., Open GL module 81) and insert this command into the FIFO list.<br>If this vertex is the last vertex of the primitive then resend the commands in the FIFO list K − 1 times. Each of them might have to be wrapped by glBegin(mode) and glEnd( ) commands depending on the mode parameter (for e.g. if mode is GL_POLYGON) |
| glDrawArrays( mode, first, count), glDrawElements( mode, count, type, indices) | For view-tag = 0, 1, . . . , K − 1<br>glMultiTexCoord( GL_TEXTUREi, view-tag)<br>glDrawArrays( ) / glDrawElements( ) with unmodified parameters |
| glBindFramebufferEXT( target, framebuffer) | Disable stereoscopic rendering (because the application is rendering to a texture)<br>Set the vertex shaders to use the original vertex program |
| glCopyTexImage2D( ), glReadPixels( ) | If the application is trying to read from the framebuffer then send modified calls to the OpenGL that effectively transfers the pixels of only one viewpoint |
| glDrawBuffer( target) | If the target is the framebuffer then enable stereoscopic rendering (if disabled)<br>Set the modified vertex shader program<br>Pass the call to OpenGL driver (e.g., OpenGL module 81) |
| All other commands | Pass to the OpenGL driver (e.g. OpenGL module 81) |

The methods of operation for implementing a modified graphics rendering pipeline having an existing GPU (See e.g., FIG. 9) as set forth in FIGS. 12, 14 and 16, may be embodied by a computer program product. The computer program product includes a computer-readable storage medium, such as the non-volatile storage medium, and computer-readable program code portions, such as a series of computer instructions, embodied in the computer-readable storage medium. Typically, the computer program is stored by a memory device, such as memory 40 or memory 42 (or memory 97), and executed by an associated processing unit, such as controller 20 or processor 96.

In this regard, FIGS. 12, 14 and 16 are flowcharts of methods and program products according to exemplary embodiments of the invention. It will be understood that each step of the flowcharts, and combinations of the steps in the flowcharts, can be implemented by computer program instructions. These computer program instructions may be loaded onto a computer or other programmable apparatus to produce a machine, such that the instructions which execute on the computer or other programmable apparatus create means for implementing the functions specified in the flowchart step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart step(s).

Accordingly, steps of the flowcharts support combinations of means for performing the specified functions, combinations of steps for performing the specified functions and program instruction means for performing the specified functions. It will also be understood that each step of the flowcharts, and combinations of steps in the flowcharts, can be implemented by special purpose hardware-based computer systems which perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. For example, in an alternate embodiment, the system of FIG. 8 may be achieved when the primitive replication unit 50 is replaced by a vertex replication unit that is connected between the vertex shaders and the primitive assembler (e.g., triangle assembler 48). Additionally, the basic principles of the system of FIG. 8 can also be implemented in other graphics architectures such as Unified Shaders. Moreover, although specific terms are employed herein, they are used in a generic and descriptive sense only and not for purposes of limitation.

For example, in some embodiments of the GPU, the primitive assembler (6, 48, and 58) can be invoked ahead of the vertex processing unit (4, 61, and 56).

That which is claimed:

1. A method comprising:
receiving vertices corresponding to one or more primitives;
accessing viewpoint-dependent information corresponding to a plurality of viewpoints of a display based on the received vertices;
calculating, via a processor, viewpoint-independent data for the plurality of viewpoints based on the received vertices to obtain viewpoint-independent calculation results, wherein viewpoint-independent data is calculated a fewer number of times than the number of viewpoints;
converting the received vertices into at least one primitive;
replicating the at least one primitive a number of times according to the number of viewpoints to obtain a plurality of replicated primitives;
including first identifier information, in association with each of the plurality of replicated primitives, the information specifies one of the plurality of viewpoints to which each of the plurality of replicated primitives corresponds;
converting each of the plurality of replicated primitives to a plurality of pixels; and
adding second identifier information to each of the plurality of pixels, the second identifier information specifying a respective primitive and identifying a respective pixel buffer among a plurality of pixel buffers to which each of the plurality of pixels corresponds.

2. The method according to claim 1, further comprising:
performing pixel processing on each of the plurality of pixels;
transferring each of the plurality of pixels to one of the plurality of pixel buffers which corresponds to one of the plurality of viewpoints; and
outputting each of the plurality of pixels for displaying a number of images corresponding to a respective viewpoint.

3. The method according to claim 1, wherein the plurality of pixel buffers corresponds to the plurality of viewpoints.

4. The method according to claim 1, wherein accessing viewpoint-dependent information comprises retrieving viewpoint-dependent information from one or more viewpoint-dependent registers and wherein the viewpoint-dependent information comprises information relating to one or more projection matrices corresponding to the plurality of viewpoints.

5. The method according to claim 1, wherein the viewpoint-independent calculation results are used for displaying data according to the plurality of viewpoints.

6. The method according to claim 5, wherein the displaying data comprises displaying data on either one of a stereoscopic display or an autostereoscopic display.

7. An apparatus comprising:
at least one processor;
at least one memory including computer program code, the at least one memory and the computer program code configured to, with the at least one processor, cause the apparatus to perform at least the following:
receive vertices corresponding to one or more primitives;
access viewpoint-dependent information corresponding to a plurality of viewpoints of a display based on the received vertices;
calculate viewpoint-independent data for the plurality of viewpoints based on the received vertices to obtain viewpoint-independent calculation results, wherein the viewpoint-independent data is calculated a fewer number of times than the number of viewpoints;
convert the received vertices into at least one primitive;
replicate the at least one primitive a number of times according to the number of viewpoints to obtain a plurality of replicated primitives;
include first identifier information, in association with each of the plurality of replicated primitives, the information specifies one of the plurality of viewpoints to which each of the plurality of replicated primitives corresponds;
convert each of the plurality of replicated primitives to a plurality of pixels; and
add second identifier information to each of the plurality of pixels, the second identifier information specifying a respective primitive and identifying a respective pixel buffer among a plurality of pixel buffers to which each of the plurality of pixels corresponds.

8. A method comprising:
defining a projection matrix corresponding to a number of viewpoints of a display;
replicating, via a processor, at least one primitive, based on received vertices, a number of times corresponding to the number of viewpoints to obtain a plurality of replicated primitives;
assigning each of the plurality of replicated primitives a first identifier which specifies one of a plurality of viewpoints to which each of the replicated primitives corresponds;
calculating viewpoint-dependent data based on vertices corresponding to each of the replicated primitives to obtain a plurality of viewpoint dependent calculation results, the first identifier specifying a respective viewpoint that is used in calculating the viewpoint-dependent data;
converting each of the plurality of replicated primitives into a plurality of pixels, each of the plurality of pixels containing a second identifier which specifies one of the plurality of viewpoints to which each of the pixels corresponds;
performing pixel processing on each of the plurality of pixels which comprises viewpoint-dependent calculations based on the second identifier; and
outputting each of the plurality of pixels to a pixel buffer.

9. The method according to claim 8, further comprising:
generating a plurality of replicated pixel buffers based on the pixel buffer, the plurality of replicated pixel buffers corresponding to the number of viewpoints; and
assigning each replicated pixel buffer to a respective viewpoint.

10. The method according to claim 9, wherein generating a plurality of replicated pixel buffers comprises partitioning the pixel buffer into a plurality of grids with each grid corresponding to a respective replicated pixel buffer.

11. The method according to claim 10, wherein, each replicated pixel buffer has a lower resolution than the pixel buffer and wherein a composite of the plurality of replicated pixel buffers is substantially equal in size to the pixel buffer.

12. The method according to claim 10, wherein each replicated pixel buffer has a resolution substantially equal to that of the pixel buffer and wherein a composite of the plurality of replicated pixel buffers is larger than the pixel buffer.

13. The method according to claim 10, further comprising, prior to the generating a plurality of replicated pixel buffers, verifying that vertex projections corresponding to vertices of the plurality of replicated primitives are offset to correspond to a respective replicated pixel buffer.

14. The method according to claim 10, further comprising transferring each of the plurality of pixels output to the pixel buffer to a respective replicated pixel buffer based on the second identifier.

15. The method of claim 8, further comprising:
directing sending of each of the pixels to respective pixel buffers based on the second identifier, each of the respective pixel buffers correspond to a respective one of the viewpoints; and
displaying a plurality of images based on the pixels stored in the pixel buffers, each of the images corresponds to a respective viewpoint.

16. A computer program product comprising at least one non-transitory computer-readable storage medium having computer-readable program code portions stored therein, the computer-readable program code portions comprising:
a first executable portion configured to cause receipt of vertices corresponding to one or more primitives;
a second executable portion configured to access viewpoint-dependent information corresponding to a plurality of viewpoints of a display based on the received vertices;
a third executable portion configured to calculate viewpoint-independent data for the plurality of viewpoints based on the received vertices to obtain viewpoint-independent calculation results, wherein viewpoint-independent data is calculated a fewer number of times than the number of viewpoints;
a fourth executable portion configured to convert the received vertices into at least one primitive;
a fifth executable portion configured to replicate the at least one primitive a number of times according to the number of viewpoints to obtain a plurality of replicated primitives;
a sixth executable portion configured to include first identifier information, in association with each of the plurality of replicated primitives, the information specifies one of the plurality of viewpoints to which each of the plurality of replicated primitives corresponds;
a seventh executable portion configured to convert each of the plurality of replicated primitives to a plurality of pixels; and
an eighth executable portion configured to add second identifier information to each of the plurality of pixels, the second identifier information specifying a respective primitive and identifying a respective pixel buffer among a plurality of pixel buffers to which each of the plurality of pixels corresponds.

17. A method comprising:
receiving vertices corresponding to at least one primitive;
calling a call function corresponding to a graphics rendering framework, the call function relating to monoscopic graphics rendering;
receiving the call function and determining whether the call function relates to transfer of an individual primitive among a plurality of primitives or an array of primitives;
receiving each of the plurality of primitives and when the call function relates to transfer of an individual primitive among the plurality of primitives, tracking a vertex attribute of the individual primitive;
replicating, via a processor, a received primitive, among the plurality of primitives, a number of times corresponding to a number of viewpoints of a display, wherein replicating comprises subtracting a predefined value from the plurality of viewpoints to obtain a first plurality of replicated primitives, the first plurality of replicated primitives being used to generate a first plurality of stereoscopic images;

receiving the array of primitives when the call function relates to transfer of the array of primitives; and replicating the array of primitives a number of times by subtracting a predefined value from a plurality of received call functions which correspond to a number of viewpoints to obtain a second plurality of replicated primitives, the second plurality of replicated primitives being used to generate a second plurality of stereoscopic images.

18. The method according to claim 17, further comprising assigning a first identifier to each of the first plurality of replicated primitives, the first identifier corresponding to a respective viewpoint.

19. The method according to claim 17, further comprising assigning a second identifier to each of the second plurality of replicated primitives, the second identifier corresponding to a respective viewpoint.

20. The method according to claim 18, further comprising:

modifying an original vertex shading routine to obtain a modified vertex shading routine;

transforming each of the first plurality of replicated primitives based on a first projection matrix containing data relating to the plurality of viewpoints according to the modified vertex shading routine; and performing viewpoint-dependent calculations on each of the first plurality of replicated primitives based on the first identifier to obtain viewpoint-dependent data.

21. The method according to claim 20, wherein the modifying an original vertex shading routine comprises:

determining the first identifier of a respective one of the first plurality of replicated primitives;

retrieving the first projection matrix corresponding to the viewpoint of the respective one of the first plurality of replicated primitives; and replacing data of an original projection matrix with the viewpoint-dependent data.

22. The method according to claim 19, further comprising:

modifying an original vertex shading routine to obtain a modified vertex shading routine;

transforming each of the second plurality of replicated primitives based on a second projection matrix containing data relating to the plurality of viewpoints according to the modified vertex shading routine; and performing viewpoint-dependent calculations on each of the second plurality of replicated primitives based on the second identifier to obtain viewpoint-dependent data.

23. A system comprising:

with each of the plurality of replicated primitives, the information specifies one of the plurality of viewpoints to which each of the plurality of replicated primitives corresponds;

means for converting each of the plurality of replicated primitives to a plurality of means for receiving vertices corresponding to one or more primitives;

means for accessing viewpoint-dependent information corresponding to a plurality of viewpoints of a display based on the received vertices;

means for calculating viewpoint-independent data for the plurality of viewpoints based on the received vertices to obtain viewpoint-independent calculation results, wherein viewpoint-independent data is calculated a fewer number of times than the number of viewpoints;

means for converting the received vertices into at least one primitive;

means for replicating the at least one primitive a number of times according to the number of viewpoints to obtain a plurality of primitives;

means for including first identifier information, in association pixels; and means for adding second identifier information to each of the plurality of pixels, the second identifier information specifying a respective primitive and identifying a respective pixel buffer among a plurality of pixel buffers to which each of the plurality of pixels corresponds.

* * * * *

UNITED STATES PATENT AND TRADEMARK OFFICE
CERTIFICATE OF CORRECTION

PATENT NO. : 8,284,204 B2
APPLICATION NO. : 11/428159
DATED : October 9, 2012
INVENTOR(S) : Kalaiah et al.

It is certified that error appears in the above-identified patent and that said Letters Patent is hereby corrected as shown below:

In the Specifications:

Column 4,
Line 62, "modem computers" should read --modern computers--.

In the Claims:

Column 34,
Lines 11 - 38 should read:
--23. A system comprising:
means for receiving vertices corresponding to one or more primitives;
means for accessing viewpoint-dependent information corresponding to a plurality of
    viewpoints of a display based on the received vertices;
means for calculating viewpoint-independent data for the plurality of viewpoints based on the
    received vertices to obtain viewpoint-independent calculation results, wherein
    viewpoint-independent data is calculated a fewer number of times than the
    number of viewpoints;
means for converting the received vertices into at least one primitive;
means for replicating the at least one primitive a number of times according to the number of
    viewpoints to obtain a plurality of primitives;
means for including first identifier information, in associate with each of the plurality of replicated
    primitives, the information specifies one of the plurality of viewpoints to which each of the
    plurality of replicated primitives corresponds;
means for converting each of the plurality of replicated primitives to a plurality of pixels; and
means for adding second identifier information to each of the plurality of pixels, the second identifier
    information specifying a respective primitive and identifying a respective pixel buffer
    among a plurality of pixel buffers to which each of the plurality of pixels corresponds.--.

Signed and Sealed this
Twenty-first Day of May, 2013

Teresa Stanek Rea
*Acting Director of the United States Patent and Trademark Office*